United States Patent
Hanaoka et al.

(10) Patent No.: US 10,859,814 B2
(45) Date of Patent: Dec. 8, 2020

(54) ELECTRO-OPTICAL DEVICE, MANUFACTURING METHOD THEREOF, AND ELECTRONIC APPARATUS

(71) Applicant: SEIKO EPSON CORPORATION, Tokyo (JP)

(72) Inventors: Terunao Hanaoka, Suwa (JP); Shuhei Yamada, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 161 days.

(21) Appl. No.: 15/651,659

(22) Filed: Jul. 17, 2017

(65) Prior Publication Data

US 2017/0315344 A1    Nov. 2, 2017

Related U.S. Application Data

(62) Division of application No. 15/040,725, filed on Feb. 10, 2016, now abandoned.

(30) Foreign Application Priority Data

Mar. 26, 2015  (JP) .................................. 2015-063931

(51) Int. Cl.
  *G02B 5/08* (2006.01)
  *G02B 7/182* (2006.01)
  *G02B 26/08* (2006.01)

(52) U.S. Cl.
  CPC ..... *G02B 26/0833* (2013.01); *G02B 26/0841* (2013.01)

(58) Field of Classification Search
  CPC .. G02B 26/001; G02B 26/08; G02B 26/0833; G02B 26/0841; G02B 26/085; G02B 26/0858; G02B 26/0866; G02B 26/105; G02B 26/121; H01L 31/02002; H01L 31/0203; H01L 31/02327; H01L 33/62; H01L 33/483; H01L 33/0095; H01L 23/10; B81B 7/008; B81B 7/0038; B81B 7/0048; B81B 7/0064; B81B 7/0077; B81C 1/00166; B81C 1/00214; B81C 1/00333; B81C 1/00904; B81C 1/00269; B81C 1/00246; B81C 1/00547; B81C 1/00158

(Continued)

(56) References Cited

U.S. PATENT DOCUMENTS 6,856,014 B1    2/2005  Ehmke et al.
8,159,059 B2    4/2012  Maeda
(Continued)

FOREIGN PATENT DOCUMENTS

JP    2008-242451 A    10/2008
WO    2008/023465 A1    2/2008

OTHER PUBLICATIONS

May 20, 2016 Office Action Issued in U.S. Appl. No. 15/040,725.
May 5, 2017 Office Action Issued in U.S. Appl. No. 15/040,725.

*Primary Examiner* — Mustak Choudhury
(74) *Attorney, Agent, or Firm* — Oliff PLC

(57) ABSTRACT

In an electro-optical device, a mirror that is formed on an element substrate is sealed by a frame shaped spacer and a plate-like light-transmitting cover which is adhered to the spacer. An inorganic barrier layer is formed on an outer face of the spacer and a side face of the light-transmitting cover, and the boundary of the spacer and the light-transmitting cover is covered by the inorganic barrier layer.

7 Claims, 15 Drawing Sheets

(58) Field of Classification Search
USPC .......... 359/849–851, 512–514, 198.1–199.4,
359/200.6–200.8, 202.1, 221.2,
359/223.1–225.1, 226.2, 290–295, 838,
359/846, 871, 872, 904; 257/98, 116,
257/414, 678, 687, 700, 730;
250/198.1–199.4, 200.6–200.8, 202.1,
250/221.2, 223.1–225.1, 226.2, 290–295,
250/838, 846, 871, 872, 904; 398/12, 19,
398/45
See application file for complete search history.

(56) References Cited

U.S. PATENT DOCUMENTS

| | | |
|---|---|---|
| 8,349,635 B1 | 1/2013 | Gan et al. |
| 9,260,294 B2 | 2/2016 | Lee et al. |
| 2005/0263866 A1* | 12/2005 | Wan .................. B81C 1/00269 |
| | | 257/678 |
| 2007/0001247 A1 | 1/2007 | Patel et al. |
| 2008/0231938 A1 | 9/2008 | Pan |
| 2008/0273233 A1* | 11/2008 | Pan .................. G02B 26/0833 |
| | | 359/223.1 |
| 2009/0261691 A1 | 10/2009 | Maeda |

* cited by examiner

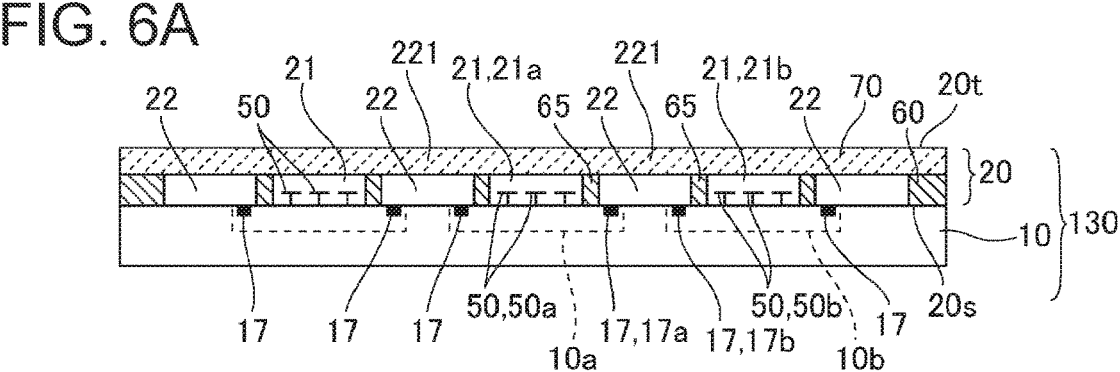
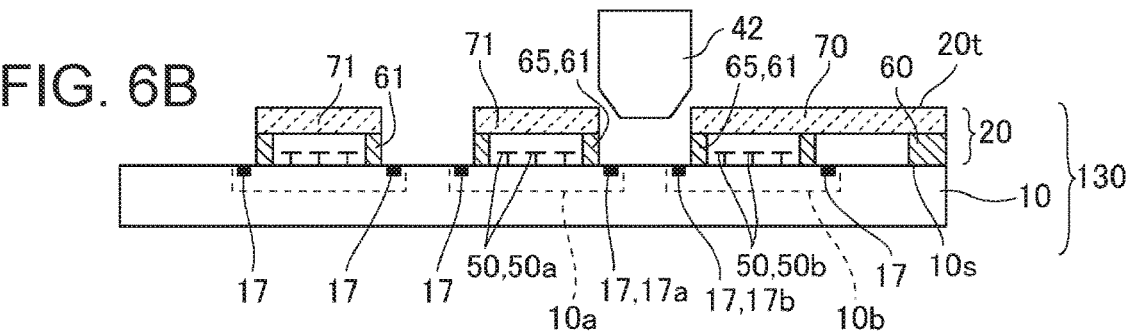
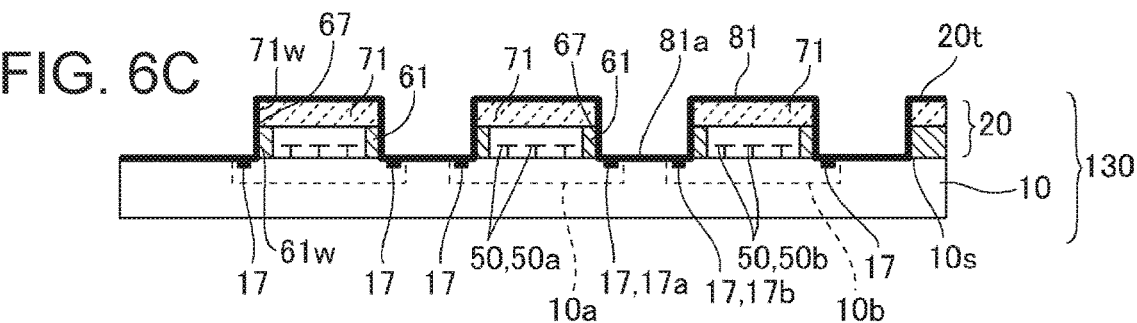
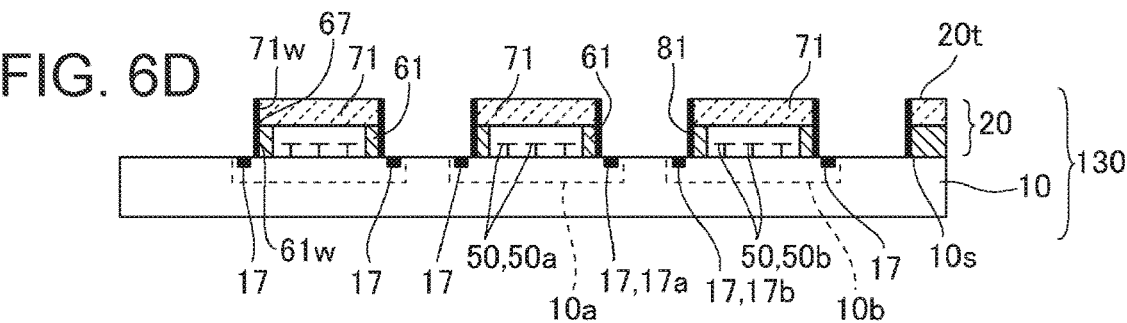
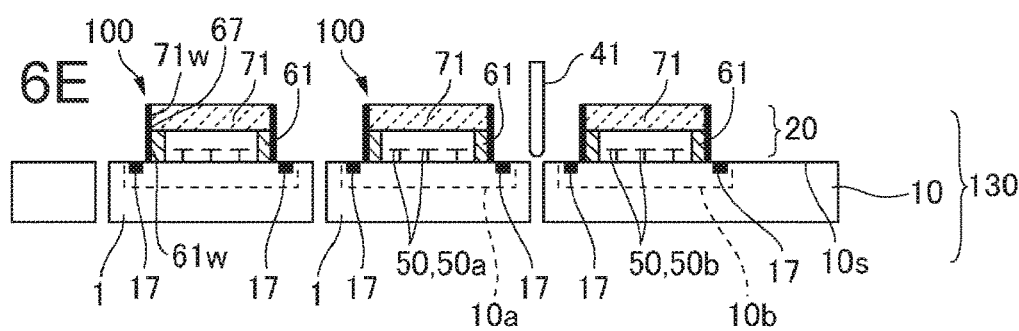

ELECTRO-OPTICAL DEVICE, MANUFACTURING METHOD THEREOF, AND ELECTRONIC APPARATUS

This is a Division of U.S. application Ser. No. 15/040,725 filed Feb. 10, 2016, which claims the benefit of Japanese Application No. 2015-063931, filed Mar. 26, 2015. The disclosures of the prior applications are hereby incorporated by reference herein in their entireties.

BACKGROUND

1. Technical Field

The present invention relates to an electro-optical device which is provided with a mirror, a manufacturing method thereof, and an electronic apparatus.

2. Related Art

As the electronic apparatus, for example, a projection-type display apparatus and the like is known which displays an image on a screen by enlarging and projecting modulated light using a projection optical system after light which is emitted from a light source is modulated by a plurality of mirrors (micro mirrors) of an electro-optical device referred to as a digital mirror device (DMD). As shown in FIG. 16, the electro-optical device which is used in the projection-type display apparatus and the like has an element substrate 1 which is provided with a plurality of mirrors 50 on one face 1s side, the mirror 50 is sealed by a spacer 61 which is adhered to the one face 1s side of the element substrate 1 so as to surround the mirror 50, and a plate-like light-transmitting cover 71 which is adhered to an end section on the opposite side from the element substrate 1 of the spacer 61.

As a method for manufacturing the electro-optical device, a method is proposed in which a second wafer, which is obtained by overlapping and adhering a spacer wafer with a through hole formed thereon and a light-transmitting wafer, is adhered to a first wafer on which the mirror 50 is provided on the one face 10s side, and the first wafer and the second wafer are split (for example, refer to U.S. Pat. No. 6,856,014 B1). According to the method, the spacer 61 is formed by the spacer wafer after splitting, and the light-transmitting cover 71 is formed by the light-transmitting wafer after splitting.

However, according to the manufacturing method described in U.S. Pat. No. 6,856,014 B1, there is a problem in that it is not possible to avoid infiltration of moisture via a boundary 67 of the spacer 61 and the light-transmitting cover 71 since the spacer 61 and the light-transmitting cover 71 are adhered to each other. The infiltration of moisture causes adsorption of the tilted mirror 50 to a member on the periphery thereof via water droplets when the mirror 50 is driven. The adsorption is not preferable since the adsorption inhibits moving of the mirror 50 and the like.

SUMMARY

An advantage of some aspects of the invention is to provide an electro-optical device which is able to suppress moisture infiltrating via a boundary of a spacer and a light-transmitting cover with respect to a space in which a mirror is disposed, a manufacturing method of the electro-optical device, and an electronic apparatus.

An electro-optical device according to an aspect of the invention includes an element substrate, a mirror which is provided on a first face side of the element substrate, a driving element which is provided on the first face side of the element substrate and which drives the mirror, a frame-shaped spacer which surrounds the mirror and the driving element in planar view, and first end section of which is fixed to the element substrate, a light-transmitting cover which is fixed to a second end section on an opposite side from the first end section of the spacer, has light-transmitting property, and is provided above the first face side such that the mirror is positioned between the element substrate and the light-transmitting cover, and an inorganic layer which covers a boundary of the spacer and the light-transmitting cover.

In the aspect of the invention, the first face side of the element substrate on which the mirror and the driving element are provided is sealed by the spacer and the light-transmitting cover, and the inorganic layer is formed which covers the boundary between the spacer and the light-transmitting cover. For this reason, it is possible to suppress infiltration of moisture from the boundary of the spacer and the light-transmitting cover using the inorganic layer. Accordingly, the electro-optical device has less incidence of a failure in which, when the mirror is driven, the mirror is adsorbed by a member on the periphery thereof in a tilted position due to water droplets and becomes unable to move.

The aspect of the invention may adopt a configuration in which the inorganic layer continues from an outer face on an opposite side from the mirror of the spacer to the side face of the light-transmitting cover. With this configuration, it is possible to reliably cover the boundary of the spacer and the light-transmitting cover.

The aspect of the invention may adopt a configuration in which the spacer is provided with a protruding section which protrudes toward an opposite side from the mirror from the side face of the light-transmitting cover, and the inorganic layer continues from the outer face of the spacer to the side face of the light-transmitting cover via the face on the opposite side from a face which faces the element substrate of the protruding section. With this configuration, it is possible to reliably cover the boundary of the spacer and the light-transmitting cover.

The aspect of the invention may adopt a configuration in which the light-transmitting cover is provided with a protruding section which protrudes toward the opposite side from the mirror from an outer face on the opposite side from the mirror of the spacer, and the inorganic layer continues from the outer face of the spacer to the face which faces the element substrate of the protruding section. With this configuration, it is possible to reliably cover the boundary of the spacer and the light-transmitting cover.

The aspect of the invention may adopt a configuration in which the inorganic layer includes at least one layer out of an aluminum oxide layer, a silicon oxide layer, and a silicon nitride layer.

A manufacturing method of an electro-optical device according to another aspect of the invention includes preparing a first wafer which is provided with a first mirror and a first driving element that drives the first mirror in a first region on a first face side, and which is provided with a second mirror and a second driving element that drives the second mirror in a second region on the first face side, forming a second wafer which is obtained by overlapping and adhering a light-transmitting wafer and a spacer wafer and which is provided with a second face on which a first concave section and a second concave section which penetrate the spacer wafer are provided, adhering the first face of the first wafer and the second face of the second wafer such that the first concave section overlaps with the first mirror in planar view and such that the second concave section overlaps with the second mirror in planar view, and splitting a stacked body of the first wafer and the second wafer at a region between the first region and second region, in which before the splitting, forming of an inorganic layer which covers a boundary of the light-transmitting wafer and the spacer wafer is performed.

In the aspect of the invention, the forming of an inorganic layer in which an inorganic layer which covers the boundary of the light-transmitting wafer and the spacer wafer in the groove is formed is performed before the splitting of a stacked body for obtaining the electro-optical device by splitting the stacked body into the first wafer and the second wafer. For this reason, it is possible to manufacture the electro-optical device in which the inorganic layer which covers the boundary of the spacer and the light-transmitting cover is formed on the outer face opposite from the mirror of the spacer and the side face of the light-transmitting cover. With such an electro-optical device, it is possible to suppress infiltration of moisture from the boundary of a cover section and the spacer using the inorganic layer. Accordingly, the electro-optical device has less incidence of a failure in which, when the mirror is driven, the mirror is adsorbed by a member on the periphery thereof in a tilted position due to water droplets and becomes unable to move.

The manufacturing method of the electro-optical device according to the aspect of the invention may adopt a configuration in which, in the forming of the second wafer, the second wafer in which a groove is provided between the first concave section and the second concave section is formed.

In the manufacturing method of the electro-optical device according to the aspect of the invention, it is preferable that, in the forming of the second wafer, the groove is formed so as to penetrate the spacer wafer before overlapping and adhering the light-transmitting wafer and the spacer wafer. With this configuration, it is possible to perform penetrating which will be described later utilizing typical etching since no adhesive layer is interposed between the light-transmitting wafer and the spacer wafer.

The manufacturing method of the electro-optical device according to the aspect of the invention may adopt a configuration in which, after the adhering and before the splitting, penetrating of the groove by removing a bottom section of the groove up to a third face on an opposite side from the second face of the second wafer is performed, and after the penetrating, the inorganic layer is formed from the third face side to the inside of the groove before the splitting.

The manufacturing method of the electro-optical device according to the aspect of the invention may adopt a configuration in which, after the forming of the second wafer and before the adhering, penetrating of the groove by removing the bottom section of the groove up to the third face which is a face on an opposite side from the second face of the second wafer is performed, and after the adhering, the inorganic layer is formed from the third face side to the inside of the groove before the splitting.

The manufacturing method of the electro-optical device according to the aspect of the invention may adopt a configuration in which, before the adhering, penetrating of the groove by removing the bottom section of the groove up to the third face which is a face on the opposite side from the second face of the second wafer is performed, and after the penetrating and before the adhering, the inorganic layer is formed from the third face side to the inside of the groove.

In the manufacturing method of the electro-optical device according to the aspect of the invention, it is preferable that, in the forming of the second wafer, the groove is formed so as to penetrate the spacer wafer, and in the penetrating, the light-transmitting wafer is removed more widely than the width of the groove. In this case, the inorganic layer reliably covers the boundary of the spacer wafer and the light-transmitting wafer when the inorganic layer is formed from the third face side in the forming of the inorganic layer, since the light-transmitting wafer is formed to protrude to the groove side from the spacer wafer inside the groove at the boundary of the spacer wafer and the light-transmitting wafer.

In the manufacturing method of the electro-optical device according to the aspect of the invention, it is preferable that, after the forming of the inorganic layer and the adhering, and before the splitting, grinding or polishing on the third face of the second wafer is performed, and the inorganic layer is removed from the third face. In this case, it is possible to easily prevent the inorganic layer from remaining on the front face of the light-transmitting cover.

In the manufacturing method of the electro-optical device according to the aspect of the invention, it is preferable that, in the forming of the inorganic layer, a first portion of the inorganic layer is formed between the first region and the second region of the first wafer on the first face side, and that, after the forming of the inorganic layer and the adhering, and before the splitting, the first portion of the inorganic layer is removed in a state where an etching mask is formed. In this case, in the first wafer, it is possible to remove the inorganic layer from the front face of a terminal even if the terminal is formed at a position overlapping with the groove in planar view.

The manufacturing method of the electro-optical device according to the aspect of the invention may adopt a configuration in which, in the penetrating, the bottom section of the groove is removed by a dicing blade.

The manufacturing method of the electro-optical device according to the aspect of the invention may adopt a configuration in which, in the penetrating, the bottom section of the groove is removed by etching.

The manufacturing method of the electro-optical device according to the aspect of the invention may adopt a configuration in which, after the adhering, and before penetrating of the groove by removing the bottom section of the groove up to the third face that is a face on the opposite side from the second face of the second wafer, the forming of the inorganic layer on the inside of the groove is performed.

In the manufacturing method of the electro-optical device according to the aspect of the invention, it is preferable that, in the forming of the inorganic layer, the first portion of the inorganic layer is formed between the first region and the second region of the first wafer on the first face side, in the penetrating, the bottom section of the groove is removed from the third face of the second wafer using the dicing blade, and after the penetrating, and before the splitting, etching is performed in which the first portion of the inorganic layer that is formed on the first wafer is removed by performing etching on the inorganic layer. With this configuration, in the first wafer, it is possible to remove the inorganic layer from the front face of a terminal even if the terminal is formed at a position overlapping with the groove in planar view.

In the manufacturing method of the electro-optical device according to the aspect of the invention, it is preferable that the thickness of the dicing blade is smaller than a gap which is interposed by the inorganic layers formed on inner walls of the groove which oppose each other, and in the etching, the first portion of the inorganic layer is removed by performing etching using the light-transmitting wafer as a mask. With this configuration, it is possible to selectively carry out etching on the inorganic layer which is formed on the first wafer even if an etching mask is not provided separately since the light-transmitting wafer protrudes inside the groove.

In the manufacturing method of the electro-optical device according to the aspect of the invention, it is preferable that a terminal is formed in a region which overlaps with the groove on the first wafer, and the thickness of the dicing blade is thicker than the width of a region in which the terminal is formed. With this configuration, in the first wafer, it is possible to reliably remove the inorganic layer which is formed on a front face of the terminal.

The electro-optical device to which the invention is applied is able to be used in various electronic apparatuses, and in this case, a light source section which irradiates the mirror with light from a light source is provided in the electronic apparatus. In addition, in a case where a projection-type display apparatus is configured as the electronic apparatus, a projection optical system which projects light which is modulated using the mirror is further provided in the electronic apparatus.

BRIEF DESCRIPTION OF THE DRAWINGS

The invention will be described with reference to the accompanying drawings, wherein like numbers reference like elements.

FIGS. 6A to 6E are diagrams illustrating a process of a manufacturing method of the electro-optical device according to Embodiment 1 of the invention.

DESCRIPTION OF EXEMPLARY EMBODIMENTS

Figure 1:
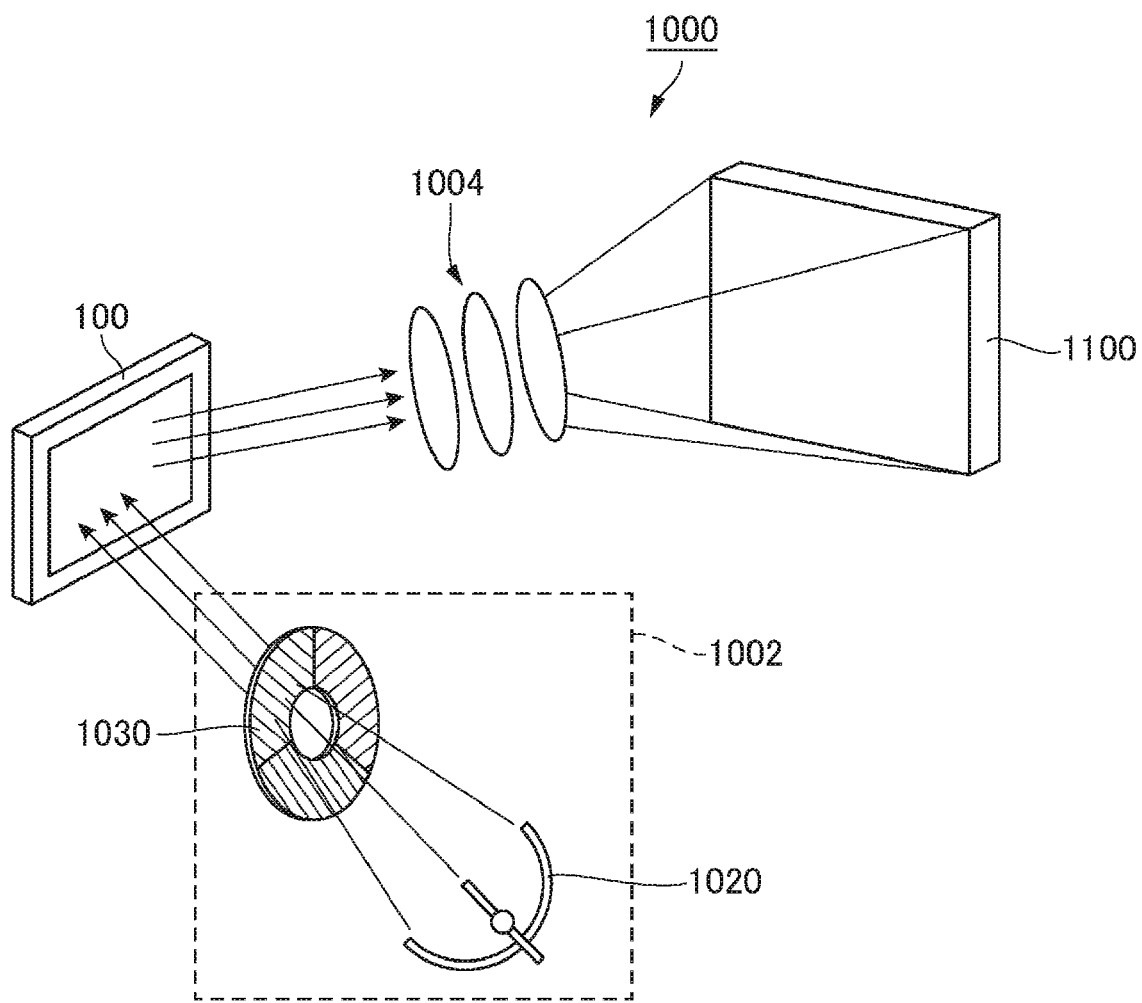
FIG. 1 is a schematic view illustrating an optical system of a projection-type display apparatus as an electronic apparatus to which the invention is applied.

Embodiments of the invention will be described with reference to the drawings. Here, a projection-type display apparatus will be described below as an electronic apparatus to which the invention is applied. In addition, in the drawings described below, the scale of each layer and each member is different in order for the sizes of each layer and each member to be to the extent so as to be recognizable in the drawings. In addition, the number of mirrors which are indicated in the drawings is set to be to the extent so as to be recognizable in the drawings, but a larger number of mirrors or the like than illustrated in the drawings may be provided. Here, in the embodiments below, for example, a case where "disposed on a first face side" is described, a case of disposing so as to come into contact with the first face, a case of disposing on the first face via another construction, or a case of disposing a portion so as to come into contact with the first face and disposing a portion via another construction may be included.

Embodiment 1

Projection-Type Display Apparatus as Electronic Apparatus

FIG. 1 is a schematic view illustrating an optical system of a projection-type display apparatus as an electronic apparatus to which the invention is applied. A projection-type display apparatus 1000 which is illustrated in FIG. 1 has a light source section 1002, an electro-optical device 100 which modulates light which is irradiated from the light source section 1002 according to image information, and a projection optical system 1004 which projects the light which is modulated by the electro-optical device 100 as a projection image onto a projection target 1100 such as a screen. The light source section 1002 is provided with a light source 1020 and a color filter 1030. The light source 1020 emits white light, the color filter 1030 emits light of each color accompanying rotation, the electro-optical device 100 modulates incident light at a timing synchronized with the rotation of the color filter 1030. Here, a fluorescent substrate which converts the light emitted from the light source 1020 to light of each color may be used in place of the color filter 1030. In addition, the light source section 1002 and the electro-optical device 100 may be provided in each light of each color.

Basic Configuration of Electro-Optical Device 100

Figure 2A:
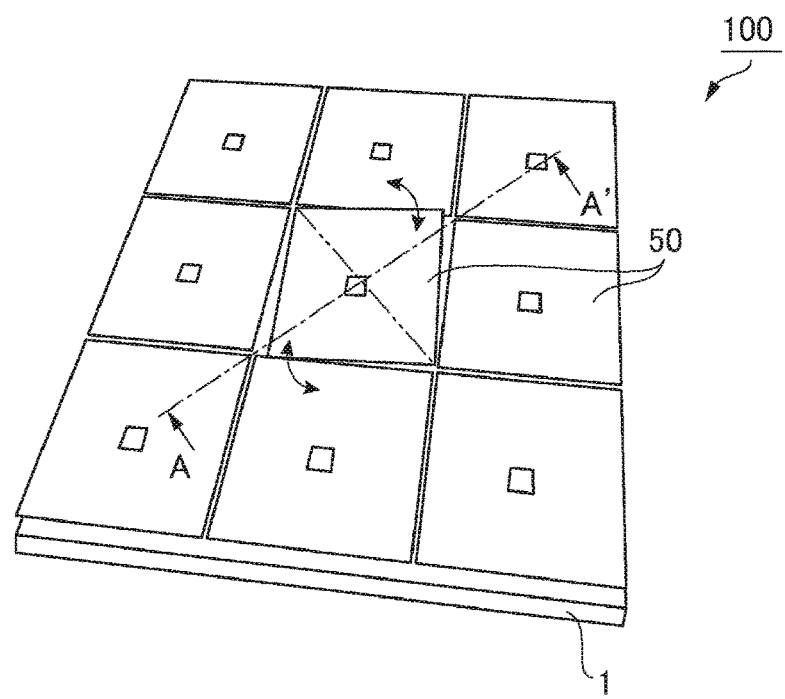
FIGS. 2A and 2B are explanatory views schematically illustrating a basic configuration of an electro-optical device to which the invention is applied.
Figure 2B:
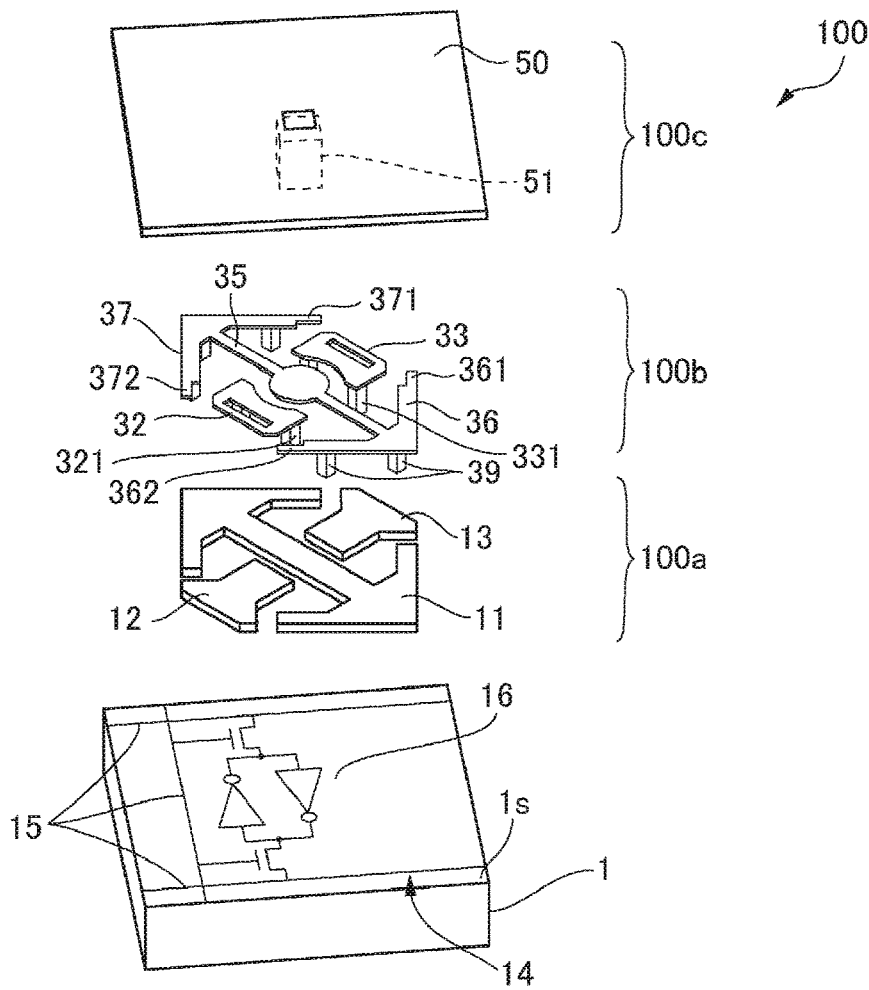
Figure 3A:
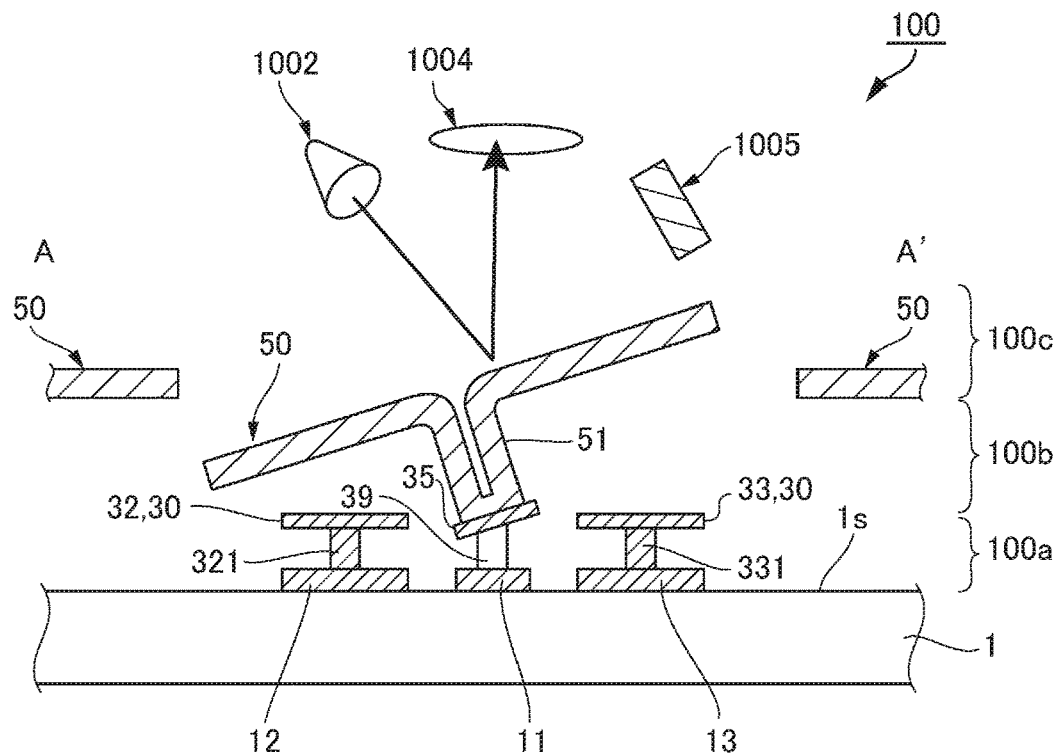
FIGS. 3A and 3B are explanatory views schematically illustrating a cross section along line A-A' in FIG. 2A of the main section of the electro-optical device to which the invention is applied.
Figure 3B:
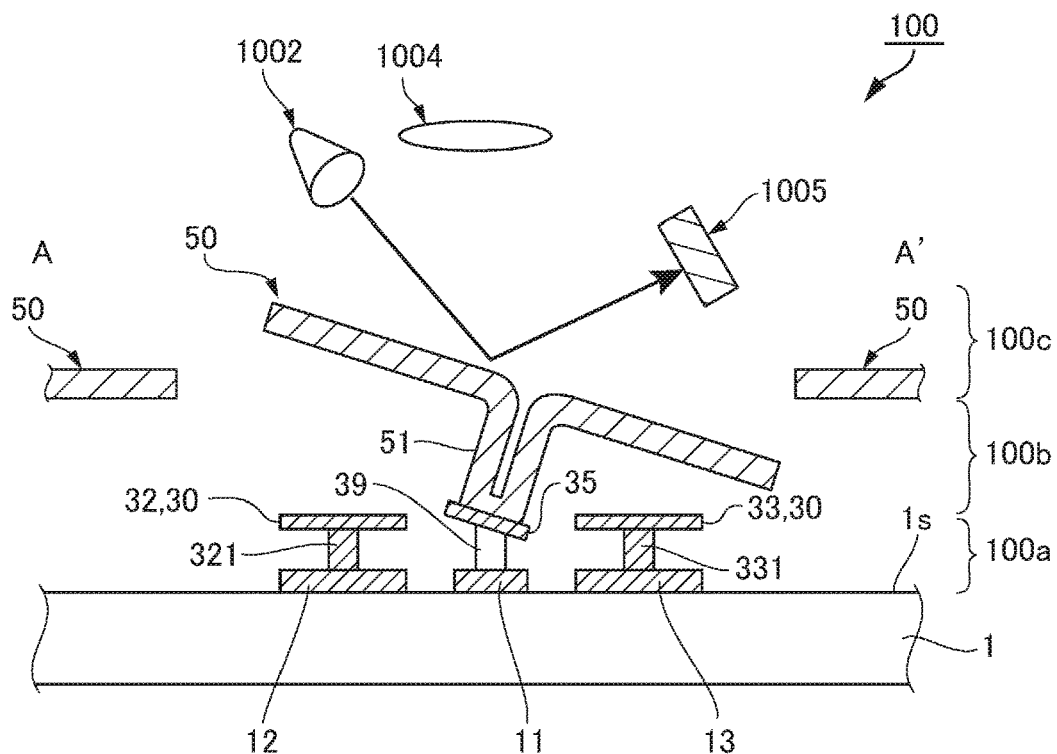

FIGS. 2A and 2B are explanatory views schematically illustrating a basic configuration of the electro-optical device 100 to which the invention is applied, FIG. 2A is an explanatory view illustrating a main section of the electro-optical device 100, and FIG. 2B is an exploded perspective diagram of the main section of the electro-optical device 100. FIGS. 3A and 3B are explanatory views schematically illustrating a cross section along line III-III in FIG. 2A of the main section of the electro-optical device 100 to which the invention is applied, FIG. 3A is an explanatory view schematically illustrating a state in which a mirror is tilted to one side, and FIG. 3B is an explanatory view schematically illustrating a state in which the mirror is tilted to another side.

As shown in FIGS. 2A to 3B, in the electro-optical device 100, a plurality of mirrors 50 are disposed in a matrix form on one face 1s (first face) side of an element substrate 1, and the mirrors 50 are separated from the element substrate 1. For example, the element substrate 1 is a silicon substrate. For example, the mirror 50 is a micro-mirror in which one side length has a planar size of, for example, 10 µm to 30 µm. For example, the mirrors 50 are disposed with an array from 800×600 to 1028×1024, and one mirror 50 corresponds to one pixel of an image.

A front face of the mirror 50 is a reflective face formed of a reflective metallic film of aluminum or the like. The electro-optical device 100 is provided with a first level portion 100a which includes a substrate side bias electrode 11, substrate side address electrodes 12 and 13, and the like which are formed on the one face 1s of the element substrate 1, a second level portion 100b which includes elevated address electrodes 32 and 33, and a hinge 35, and a third level portion 100c which includes the mirror 50. On the first level portion 100a, an address designating circuit 14 is formed on the element substrate 1. The address designating circuit 14 is provided with a wire 15 or the like of a memory cell, a word line, or a bit line for selectively controlling the operation of each mirror 50, and has a circuit configuration which is similar to a random access memory (RAM) which is provided with a CMOS circuit 16.

The second level portion 100b includes the elevated address electrodes 32 and 33, the hinge 35, and a mirror post 51. The elevated address electrodes 32 and 33 are supported by the substrate side address electrodes 12 and 13 while conducting to the substrate side address electrodes 12 and 13 via electrode posts 321 and 331. Hinge arms 36 and 37 extend from both sides of the hinge 35. The hinge arms 36 and 37 are supported by the substrate side bias electrode 11 while conducting to the substrate side bias electrode 11 via an arm post 39. The mirror 50 is supported by the hinge 35 while conducting to the hinge 35 via the mirror post 51. Accordingly, the mirror 50 conducts to the substrate side bias electrode 11 via the mirror post 51, the hinge 35, the hinge arms 36 and 37, and the arm post 39, and a bias voltage is applied from the substrate side bias electrode 11. Here, stoppers 361, 362, 371, and 372 which prevent contact between the mirror 50 and the elevated address electrodes 32 and 33 are formed to abut with the leading ends of the hinge arms 36 and 37 when the mirror 50 is tilted.

The elevated address electrodes 32 and 33 configure a driving element 30 which drives such that the mirror 50 is tilted by generating electrostatic force with the mirror 50. In addition, there are cases where the substrate side address electrodes 12 and 13 are also configured so as to drive such that the mirror 50 is tilted due to electrostatic force being generated with the mirror 50, in this case, the driving element 30 is configured by the elevated address electrodes 32 and 33 and the substrate side address electrodes 12 and 13. As shown in FIGS. 3A and 3B, in the hinge 35, a driving voltage is applied to the elevated address electrodes 32 and 33, the hinge 35 twists when the mirror 50 is tilted so as to be pulled toward the elevated address electrode 32 or the elevated address electrode 33, and a return force is exhibited in a posture parallel to the element substrate 1 of the mirror 50 when suction force is eliminated with respect to the mirror 50 by stopping application of the driving voltage with respect to the elevated address electrodes 32 and 33.

As shown in FIG. 3A, for example, in the electro-optical device 100, the mirror 50 tilts to the elevated address electrode 32 side at one side, and an ON state is reached in which light which is emitted from the light source section 1002 is reflected toward the projection optical system 1004 by the mirror 50. In contrast to this, as shown in FIG. 3B, the mirror 50 tilts to the elevated address electrode 33 side on the other side, and an OFF state is reached in which light which is emitted from the light source section 1002 is reflected toward a light absorbing device 1005 by the mirror 50, and in the OFF state, the light is not reflected toward the projection optical system 1004. The driving is performed for each of the plurality of mirrors 50, and as a result, the light which is emitted from the light source section 1002 is modulated to image light using the plurality of mirrors 50 and projected from the projection optical system 1004, and an image is displayed.

Here, a yoke with a flat plate form which faces the substrate side address electrodes 12 and 13 is integrally provided with the hinge 35, electrostatic force which is generated between the elevated address electrodes 32 and 33 and the mirror 50 is applied, and the mirror 50 is driven by also utilizing electrostatic force which acts between the substrate side address electrodes 12 and 13 and the yoke.

Structure of Electro-Optical Device 100 and Inorganic Barrier Layer 81

Figure 4A:
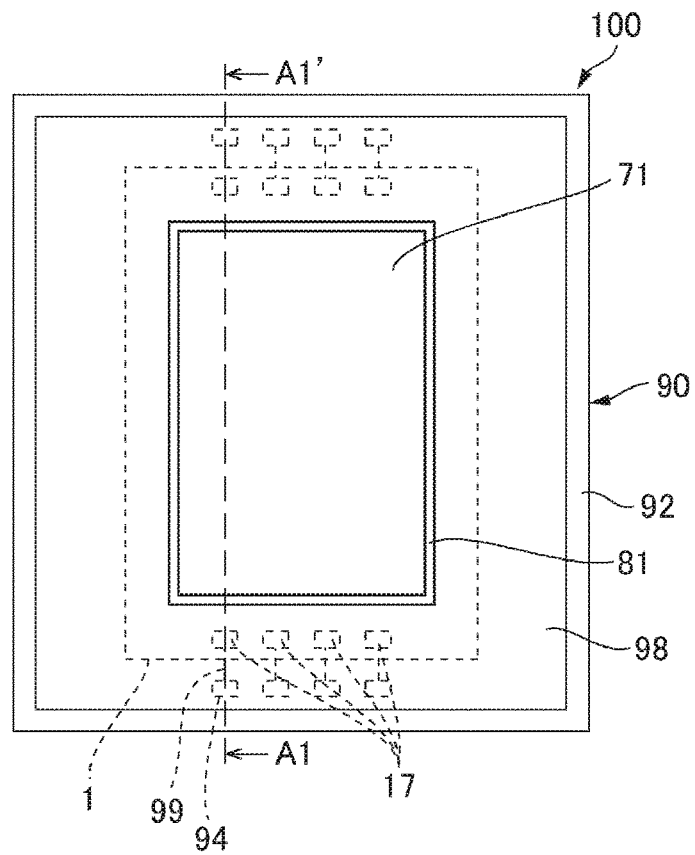
FIGS. 4A and 4B are explanatory views illustrating a detailed configuration of an electro-optical device according to Embodiment 1 of the invention.
Figure 4B:
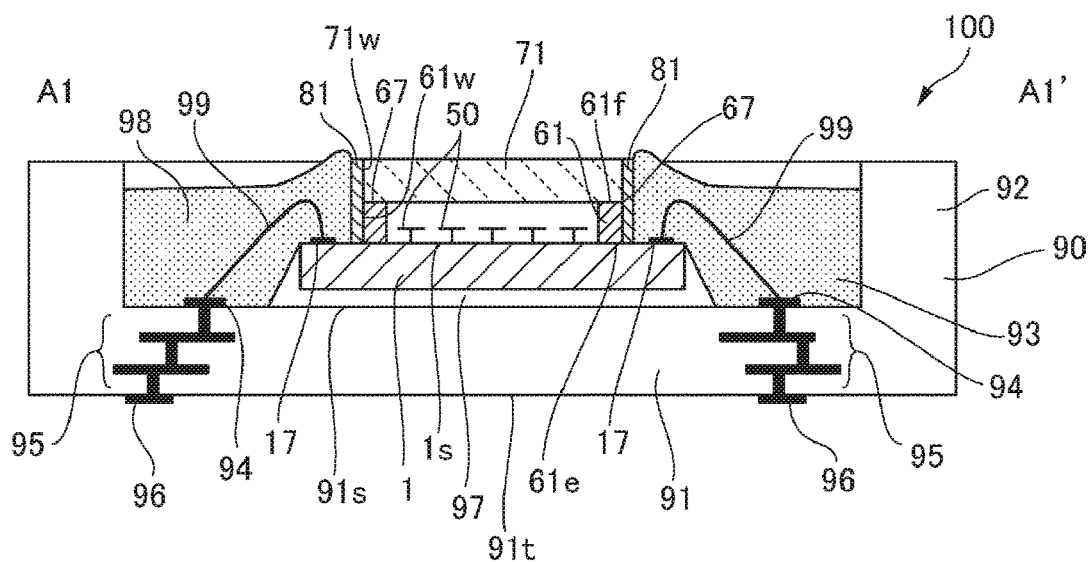

FIGS. 4A and 4B are explanatory views illustrating a detailed configuration of the electro-optical device 100 according to Embodiment 1 of the invention, FIG. 4A is a planar view of the electro-optical device 100, and FIG. 4B is a sectional view along line A1-A1'.

FIG. 4B is a sectional view of the entire electro-optical device 100 to which the invention is applied. Here, FIG. 4B illustrates reducing the number of mirrors 50 and forming five mirrors 50 on one element substrate 1.

As shown in FIGS. 4A and 4B, in the electro-optical device 100 of the embodiment, on the element substrate 1 on which a plurality of mirrors 50 are formed which are described with reference to FIGS. 2A to 3B, the one face 1s is sealed by a frame shaped spacer 61 and a flat plate form light-transmitting cover 71, and the light-transmitting cover 71 faces the front face of the mirror 50 at a position at an interval a predetermined distance from the mirror 50. Here, the spacer 61 is adhered to the element substrate 1 by an end section 61e on the element substrate 1 side. In addition, the light-transmitting cover 71 is adhered to an end section 61f (second end section) on the opposite side from the end section 61e (first end section) on the element substrate 1 side of the spacer 61, and faces the opposite side from the element substrate 1 with respect to the front face of the mirror 50. Here, the light-transmitting cover 71 has light-transmitting property, and is provided on the one face 1s side such that the mirror 50 is positioned between the element substrate 1 and a portion of the light-transmitting cover 71. In this state, the light-transmitting cover 71 surrounds a space in which the mirror 50 is disposed, together with the element substrate 1 and the spacer 61. Light passes through the light-transmitting cover 71 and is incident onto the mirror 50, then the light which is reflected using the mirror 50 passes through the light-transmitting cover 71 and is emitted. In the embodiment, the light-transmitting cover 71 is made of glass. The spacer 61 may be made of any one of glass, silicon, metal, or resin, and in the embodiment, a glass substrate or a silicon substrate is used as the spacer 61. The embodiment adopts a configuration in which there is air in a space in which the mirror 50 is disposed, a configuration in which an inert gas and the like is filled in place of air, or a configuration in which there is a vacuum. In the embodiment, the space in which the mirror 50 is disposed is a vacuum.

Both of the spacer 61 and the light-transmitting cover 71 have a planar form of a square shape, and the sizes are the same. For this reason, a plane is configured which is continuous to an outer face 61w which is positioned on the opposite side from the mirror 50 of the spacer 61 and a side face 71w of the light-transmitting cover 71.

In the electro-optical device 100 which is configured in this manner, since the spacer 61 and the light-transmitting cover 71 are separate bodies, there is a boundary 67 between the spacer 61 and the light-transmitting cover 71. Here, an inorganic barrier layer 81 (inorganic layer) is formed between the outer face 61w of the spacer 61 and the side face 71w of the light-transmitting cover 71, and the boundary 67 of the spacer 61 and the light-transmitting cover 71 is covered from the opposite side (outside) from the mirror 50 by the inorganic barrier layer 81. Here, the outer face 61w of the spacer 61 may be a face which connects the end section 61e on the element substrate side of the spacer 61 and the end section 61f of the opposite side, and may be a face which indicates the face on the opposite side from the mirror 50, and the side face of the light-transmitting cover 71 may connect a face which faces the mirror 50 of the light-transmitting cover 71 and the face opposite therefrom. In the embodiment, the inorganic barrier layer 81 may be formed on the entire face of the outer face 61w of the spacer 61 and the entire face of the side face 71w of the light-transmitting cover 71, and may connect from the outer face 61w of the spacer 61 to the side face 71w of the light-transmitting cover 71.

The inorganic barrier layer is formed of a single layer film or a plurality of laminated films out of an aluminum oxide layer, a silicon oxide layer, and a silicon nitride layer, and includes at least one out of the aluminum oxide layer, the silicon oxide layer, and the silicon nitride layer.

Sealing Structure Using Mounting Substrate 90 or the Like

In the electro-optical device 100 of the embodiment, a space in which the mirror 50 is disposed is also sealed using a mounting substrate 90 and a sealing resin 98 while being sealed by the spacer 61 and the light-transmitting cover 71. In further detail, the element substrate 1 is fixed to a substrate mounting section 93 of the mounting substrate 90 which is formed of a ceramic substrate or the like, and after that, is sealed by an epoxy based sealing resin 98 or the like. On the substrate 90, the substrate mounting section 93 is a bottomed concave section which is enclosed by a side plate section 92, and the element substrate 1 is fixed using an adhesive 97 on a bottom plate section 91 of the mounting substrate 90.

On the one face 1s of the element substrate 1, a plurality of terminals 17 are formed on an end section which does not overlap with the mirror 50 in planar view (for example, in planar view when viewed from the one face 1s side of the element substrate 1). In the embodiment, the terminals 17 are disposed in two rows so as to interpose the mirror 50. A portion of the plurality of terminals 17 are electrically connected to the elevated address electrodes 32 and 33 (driving element 30) via the address designating circuit 14 and the substrate side address electrodes 12 and 13 which are described with reference to FIGS. 2A to 3B. Another portion of the plurality of terminals 17 are electrically connected to the mirror 50 via the address designating circuit 14, the substrate side bias electrode 11, and the hinge 35 which are described with reference to FIGS. 2A to 3B. Yet another portion of the plurality of terminals 17 are electrically connected to a driving circuit or the like which is provided at the front of the address designating circuit 14 which is described with reference to FIGS. 2A to 3B.

Here, the terminal 17 is electrically connected by a wire 99 for wiring bonding to an internal electrode 94 which is formed on an inner face 91s on the element substrate 1 side of the bottom plate section 91 of the mounting substrate 90. The bottom plate section 91 of the mounting substrate 90 is a multi-layer substrate, the internal electrode 94 conducts with an external electrode 96 which is formed on an outer face 91t on a side opposite from the element substrate 1 of the bottom plate section 91 via a multi-layer section 95 which is formed of a through hole and a wire that are formed on the bottom plate section 91.

The sealing resin 98 is provided inside (in a concave section of) the side plate section 92 of the mounting substrate 90. The sealing resin 98 covers the side face of the light-transmitting cover 71 to the middle in a thickness direction while covering around the element substrate 1 and around the spacer 61.

Manufacturing Method of Electro-Optical Device 100

The manufacturing method of the electro-optical device 100 according to Embodiment 1 of the invention will be described with reference to FIGS. 5A to 8C. FIGS. 5A to 5F are diagrams illustrating a process in a manufacturing method of a first wafer 10 or the like which is used in manufacture of the electro-optical device 100 according to Embodiment 1 of the invention, FIGS. 5B to 5F illustrate cut end face views on a lower level in planar view while illustrating planar views of a wafer in each process. FIGS. 6A to 6E are diagrams illustrating a process in a manufacturing method of the electro-optical device 100 according to Embodiment 1 of the invention. FIGS. 7A to 7E are sectional views illustrating a process in a method for removing an unnecessary inorganic barrier layer 81 during the manufacture of the electro-optical device 100 according to Embodiment 1 of the invention. FIGS. 8A to 8C are sectional views illustrating a process in a method for sealing the element substrate 1 using the mounting substrate 90 and the sealing resin 98 during the manufacture of the electro-optical device 100 according to Embodiment 1 of the invention. Here, FIG. 5C illustrates only the terminal 17 and omits illustration of the mirror 50 and the like, FIGS. 6A to 8C illustrate the number of mirrors 50 being reduced in comparison to in FIGS. 4A and 4B, and three mirrors 50 being formed on one element substrate 1.

In the embodiment, a large number of a plurality of element substrates 1 are taken from a wafer. For this reason, out of the large number of the plurality of element substrates 1 which are taken, the mirror 50 and the terminal 17 which are formed in a region in which one substrate is obtained are respectively described as a first mirror 50a and a first terminal 17a where a is attached to the end of each reference numeral. In addition, out of the plurality of element substrates 1, the mirror 50 and the terminal 17 which are formed in a region adjacent to a region in which the first mirror 50a and the first terminal 17a are formed are respectively described as a second mirror 50b and a second terminal 17b where b is attached to the end of each reference numeral.

However, in a case where it is not necessary to specify the element substrate 1, description will be made without attaching a or b.

Figure 5A:
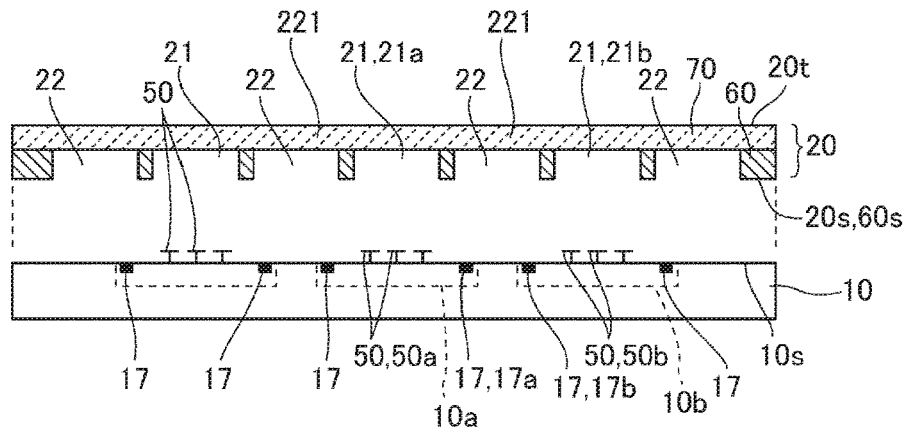
FIGS. 5A to 5F are diagrams illustrating a process in a manufacturing method of a first wafer or the like which is used in the electro-optical device according to Embodiment 1 of the invention.
Figures 5B, 5D, 5E:
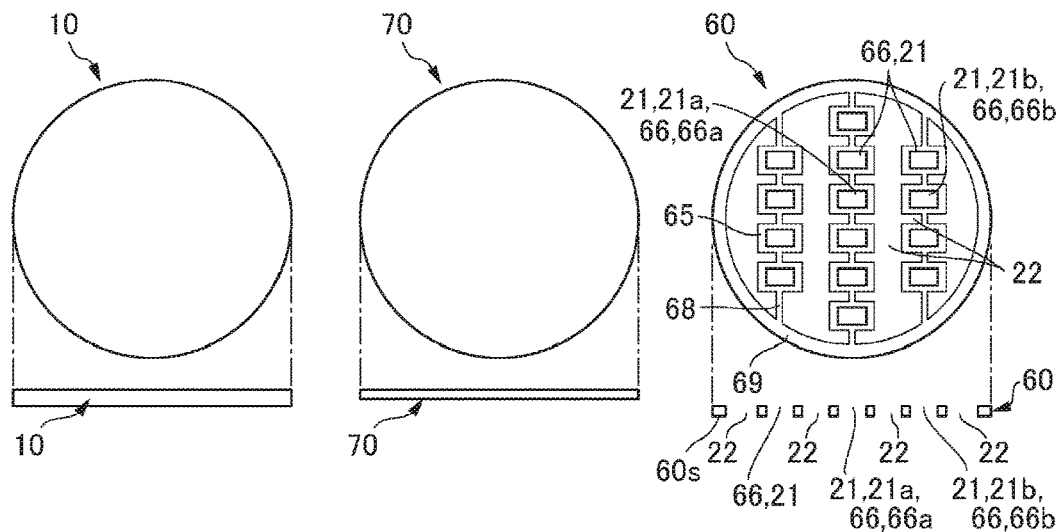
Figures 5C, 5F:
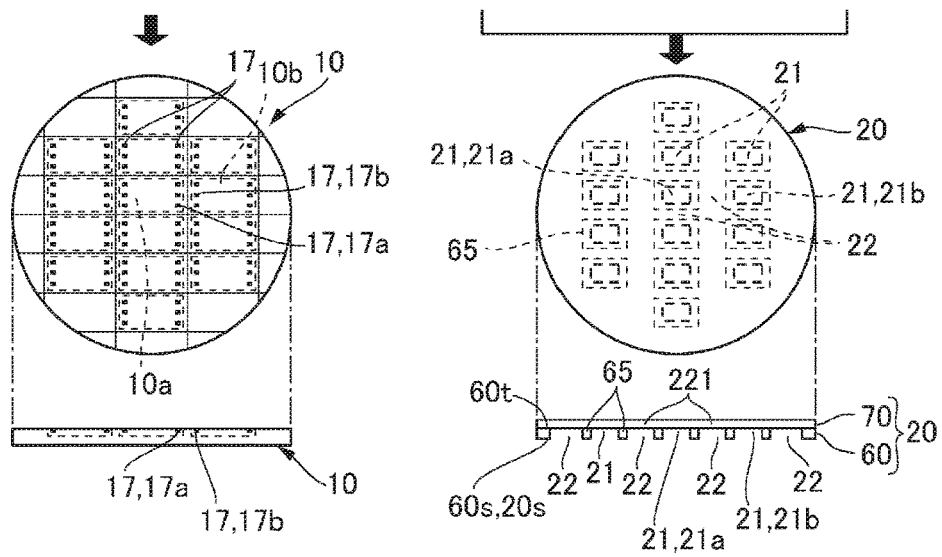

As shown in FIGS. 5A and 5C, in the manufacture of the electro-optical device 100 of the embodiment, in the first wafer preparation process, the first wafer 10 on which the terminal 17 is formed that is electrically connected to the driving element 30 (refer to FIGS. 2A to 3B) that drives the mirror 50 is prepared at a position adjacent to the mirror 50 in planar view (for example, in planar view when viewed from one face 10s side of the first wafer 10), while the mirror 50 is formed in each region in which the element substrate 1 is split with respect to the one face 10s (first face) of a large first wafer 10 which is able to take a large number of the element substrates 1. For example, as shown in FIGS. 5A, 5B, and 5C, the first wafer 10 may be prepared by forming the terminal 17 that is electrically connected to the driving element 30 (refer to FIGS. 2A to 3B) that drives the mirror 50 at a position adjacent to the mirror 50 in planar view, while the mirror 50 is formed in each region in which the element substrate 1 is split with respect to the one face 10s of the large first wafer 10 which is able to take a large number of the element substrates 1. As a result, the first terminal 17a is formed at a position adjacent to the first mirror 50a in planar view, while the first mirror 50a and the driving element 30 (first driving element) that drives the first mirror 50a are formed in a first region 10a on the one face 10s of the first wafer 10. In addition, the second terminal 17b is formed between the first terminal 17a and the second mirror 50b, while the second mirror 50b is formed on the opposite side from the first mirror 50a with respect to the first terminal 17a on the one face 10s of the first wafer 10. Here, the second mirror 50b and the driving element 30 (second driving element) which drives the second mirror 50b are formed in a second region 10b of the one face 10s.

In addition, as shown in FIG. 5A, in the forming of the second wafer, a large second wafer 20 is prepared which is able to take a large number of the spacers 61 and the light-transmitting covers 71 which have light-transmitting property. A bottomed groove 22 is formed which surrounds each of a plurality of concave sections 21 by extending in two directions which intersect perpendicularly with each other while the concave sections 21 in which the bottom section is light-transmitting are formed in each region in which the spacer 61 and the light-transmitting cover 71 are split on a second face 20s that forms one face of the second wafer 20. One out of a plurality of concave sections 21 there is a first concave section 21a, and the concave section 21 which is adjacent to the first concave section 21a is a second concave section 21b. Accordingly, the first concave section 21a in which the bottom section is light-transmitting, the second concave section 21b in which the bottom section is light-transmitting, and the bottomed groove 22 which extends along between the first concave section 21a and the second concave section 21b are formed on the second face 20s of the second wafer 20.

In the forming of the second wafer 20, in the forming of the second wafer, for example, the processes which are illustrated in FIGS. 5D to 5F are performed. First, as shown in FIG. 5D, a light-transmitting wafer 70 which is able to take a large number of light-transmitting covers 71 is prepared. In addition, as shown in FIG. 5E, a spacer wafer 60 which is able to take a large number of spacers 61 is prepared, then, in a first process, a through hole 66 for configuring the concave section 21 is formed on the spacer wafer 60 by a process of etching and the like. One of a plurality of through holes 66 is a first through hole 66a for configuring the first concave section 21a, and the through hole 66 adjacent to the first through hole 66a is a second through hole 66b for configuring the second concave section 21b. In addition, the bottomed grooves 22 which surround each of a plurality of the concave sections 21 are formed extending in two directions which intersect perpendicularly with each other on one face 60s of the spacer wafer 60 by the process of etching or the like.

In the embodiment, the through hole 66 and the groove 22 are simultaneously formed by etching. For this reason, the groove 22 passes through the spacer wafer 60 in the same manner as the through hole 66. Accordingly, a frame section 65 which is interposed by the through hole 66 and the groove 22 is connected by a linking section 68 and the like with respect to an annular outer frame section 69 of the spacer wafer 60 such that the region which is surrounded by the groove 22 is not separated. In this case, it is possible to perform a penetrating process which will be described later utilizing typical etching since no adhesive layer is interposed between the light-transmitting wafer 70 and the spacer wafer 60. However, the bottomed groove 22 may be formed in the spacer wafer 60 by half etching using a manufacturing method which will be described later.

Next, in the second process, as shown in FIG. 5F, the light-transmitting wafer 70 is overlapped and adhered on another face 60t on an opposite side from the one face 60s of the spacer wafer 60. As a result, the second wafer 20 is formed on which the spacer wafer 60 and the light-transmitting wafer 70 are laminated, and on the second wafer 20, the second face 20s of the second wafer 20 is configured using the spacer wafer 60, and a third face 20t of the second wafer 20 is configured using the light-transmitting wafer 70. In addition, one opening end of the through hole 66 is closed by the light-transmitting wafer 70, and becomes the concave section 21 (first concave section 21a and second concave section 21b) in which the bottom section is light-transmitting. In addition, the groove 22 also has a bottom section 221. In the embodiment, a circular shape wafer is used, but as a planar shape, a rectangular shape, and the like may be used.

Next, in an adhesion process as shown in FIG. 6A, the one face 10s of the first wafer 10 is adhered to the second face 20s of the second wafer 20 so that the concave section 21 overlaps with the mirror 50 in planar view (for example, in planar view when the first wafer 10 is viewed from the one face 10s side), and the groove 22 overlaps with the terminal 17. As a result, the first concave section 21a overlaps with the first mirror 50a in planar view, the second concave section 21b overlaps with the second mirror 50b in planar view, and a groove 22 common in a region which is interposed by the first terminal 17a and the second terminal 17b overlaps with the first terminal 17a and the second terminal 17b in planar view. In this state, the frame section 65 which is interposed by the first concave section 21a and the groove 22 in the second wafer 20 is adhered between the first mirror 50a and the first terminal 17a, and the frame section 65 which is interposed by the second concave section 21b and the groove 22 in the second wafer 20 is adhered between the second mirror 50b and the second terminal 17b. Accordingly, the first terminal 17a and the second terminal 17b are not adhered to the second wafer 20.

Next, in the penetrating process which is shown in FIG. 6B, the groove 22 is penetrated up to the third face 20t of the second wafer 20 by removing the bottom section 221 of the groove 22 of the second wafer 20. As a result, the second wafer 20 is separated between the first region 10a and the second region 10b. In the embodiment, the light-transmitting wafer 70 which is positioned on the bottom section 221 is removed since only the light-transmitting wafer 70 is present in the bottom section 221 of the groove 22. In the embodiment, a second wafer dicing blade 42 is caused to enter from the third face 20t of the second wafer 20 toward the groove 22, and the light-transmitting wafer 70 is split. As a result, out of the second wafer 20, the light-transmitting cover 71 is configured using a flat plate portion which is split from the light-transmitting wafer 70, and the spacer 61 is configured by a frame portion which is split from the spacer wafer 60. In the embodiment, the thickness of the second wafer dicing blade 42 is the same width as the groove 22.

Next, in the inorganic barrier layer forming process which is illustrated in FIG. 6C, the inorganic barrier layer 81 is formed from the third face 20t side of the second wafer 20 toward the inner section of the passed through groove 22. In the embodiment, the inorganic barrier layer 81 is formed on the entire body on the third face 20t side of the second wafer 20. As a result, the inorganic barrier layer 81 is formed on the outer face 61w of the spacer 61 and the side face 71w of the light-transmitting wafer 70, and the boundary 67 is covered by the inorganic barrier layer 81. In the forming of the inorganic barrier layer 81, it is possible to adopt a CVD method, a vapor disposition method, a spatter method, or the like, but when considering the throwing power to the inner section of the groove 22, the CVD method is preferable.

Figure 7A:
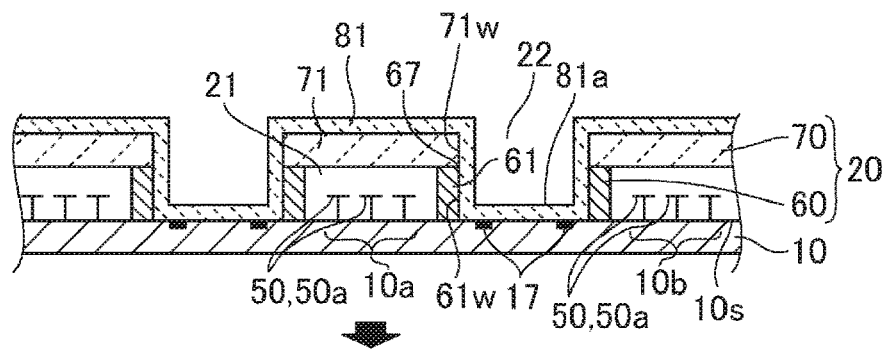
FIGS. 7A to 7E are sectional views illustrating a process in a method for removing an unnecessary inorganic layer during the manufacture of the electro-optical device according to Embodiment 1 of the invention.

Here, as shown in FIGS. 6C and 7A, the inorganic barrier layer 81 is also formed on the front face of the terminal 17 which is provided at a position which overlaps with the groove 22 in the element substrate 1, while also being formed on the front face of the light-transmitting cover 71. As a result, a portion 81a (first portion) of the inorganic barrier layer 81 is formed between the first region 10a and the second region 10b of the one face 10s. Accordingly, in the embodiment, the inorganic barrier layer 81 is removed from a position which overlaps with the front face of the light-transmitting cover 71 and the groove 22 of the element substrate 1 by the process which is illustrated in FIGS. 7B to 7E.

Figure 7B:
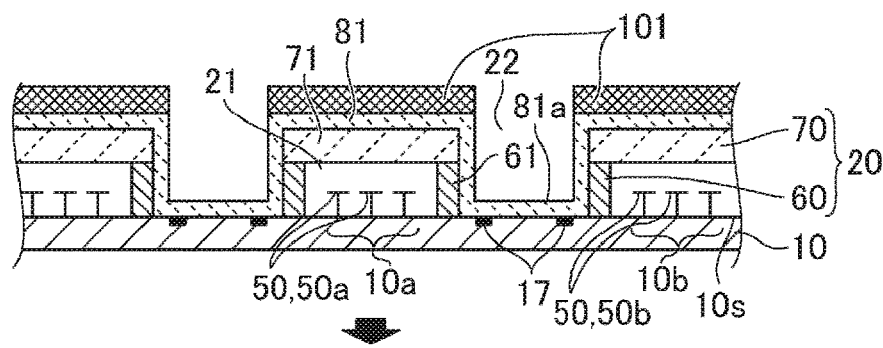
Figure 7C:
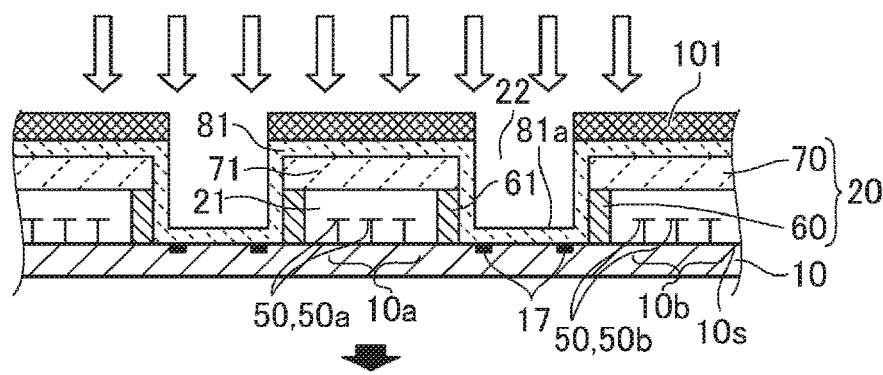
Figure 7D:
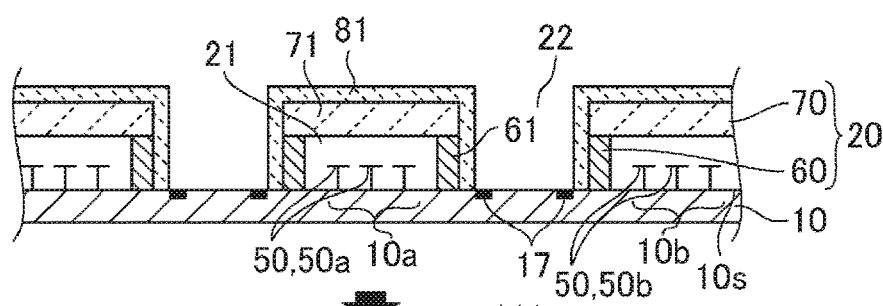
Figure 7E:
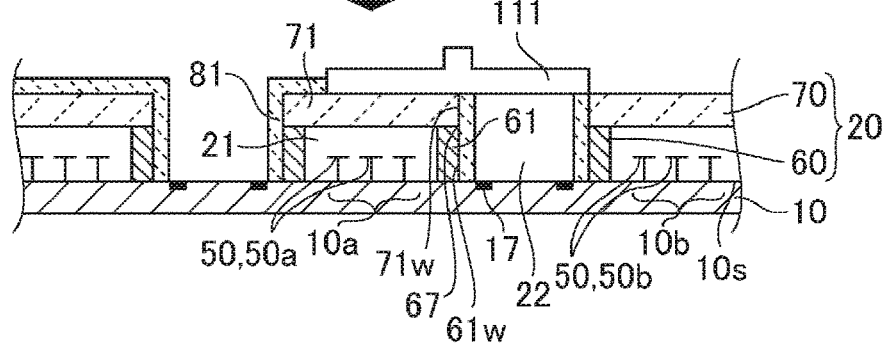
Figure 8A:
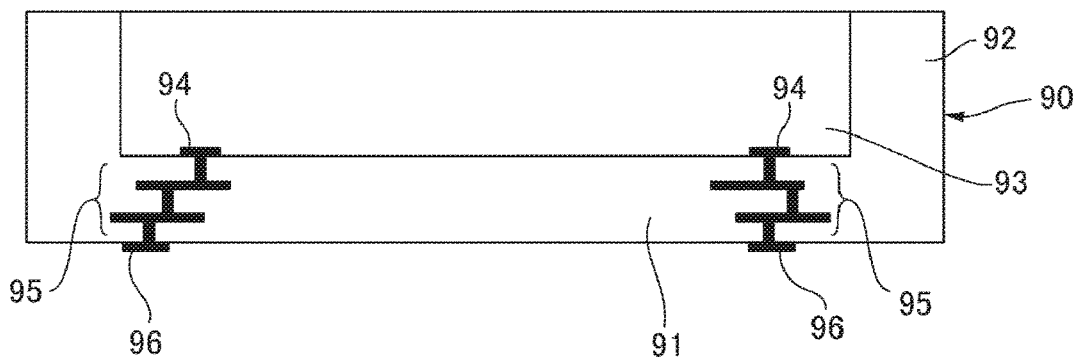
FIGS. 8A to 8C are sectional views illustrating a process in a method of sealing an element substrate using a mounting substrate and a sealing resin during the manufacture of the electro-optical device according to Embodiment 1 of the invention.
Figure 8B:
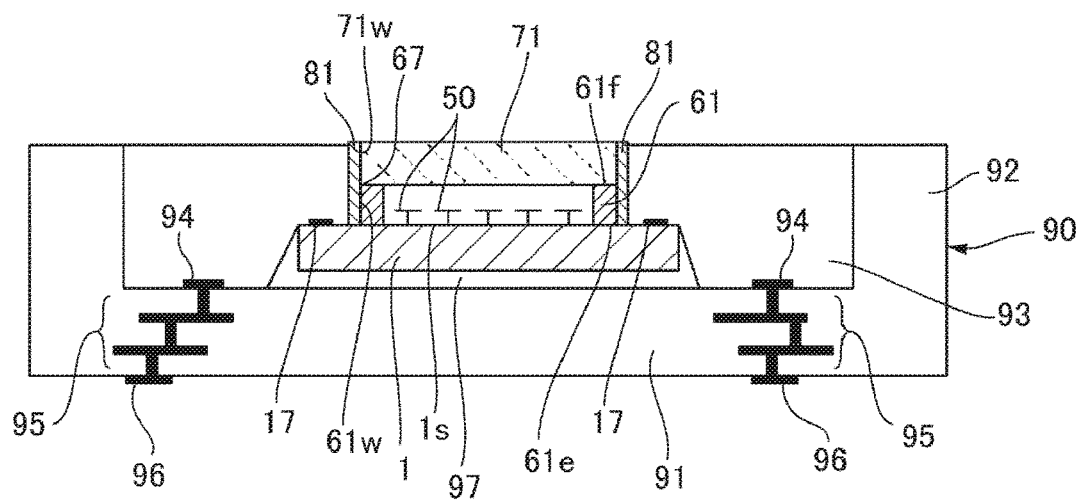
Figure 8C:
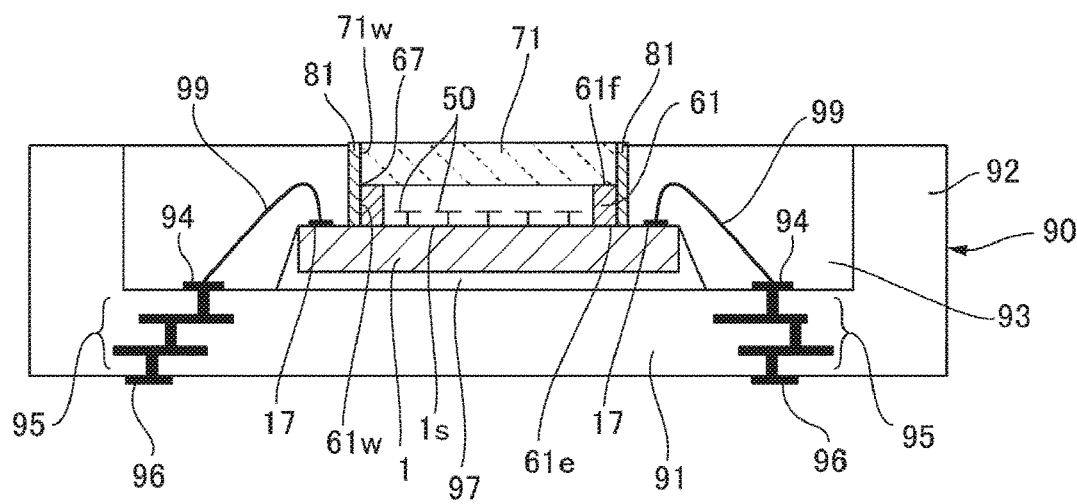

First, as shown in FIG. 7B, in a state in which a resist mask 101 is formed on the front face of the light-transmitting cover 71, as shown in FIG. 7C, anisotropic etching (dry etching) is performed, and as shown in FIG. 7D, the inorganic barrier layer 81 is removed from a region which overlaps with the groove 22 in the element substrate 1, and the terminal 17 is exposed. As a result, the portion 81a of the inorganic barrier layer 81 formed between the first region 10a and the second region 10b of the one face 10s is removed. Next, as shown in FIG. 7D, the resist mask 101 is removed, then, as shown in FIG. 7E, the inorganic barrier layer 81 which is formed on the front face of the light-transmitting cover 71 is removed by grinding or polishing. In the embodiment, the inorganic barrier layer 81 which is formed on the front face of the light-transmitting cover 71 is removed by grinding or polishing by grinding using a grinder 111. As a result, as shown in FIG. 6D, the inorganic barrier layer 81 remains only on the outer face 61w of the spacer 61 and the side face 71w of the light-transmitting wafer 70.

Next, in the splitting process, as shown in FIG. 6E, dicing is carried out on the first wafer 10 along the groove 22 in the first wafer 10 using a first wafer dicing blade 41. As a result, the first wafer 10 is separated between the first region 10a and the second region 10b. In the embodiment, dicing is carried out on the first wafer 10 by causing the first wafer dicing blade 41 to enter a cutting location (between the adjacent light-transmitting covers 71 and between the adjacent spacers 61) of the second wafer 20 from the second wafer 20 side with respect to the first wafer 10. As a result, a stacked body 130 of the first wafer 10 and the second wafer 20 is split, and a plurality of electro-optical devices 100 is manufactured. As further shown in FIGS. 4A and 4B, in a case where the electro-optical device 100 is sealed using the mounting substrate 90 and the sealing resin 98, a process illustrated in FIGS. 8A to 8C is performed.

First, as shown in FIG. 8A, the mounting substrate 90 which is a concave section in which the substrate mounting section 93 is surrounded by the side plate section 92 is prepared, then, as shown in FIG. 8B, the element substrate 1 is fixed to the bottom section of the substrate mounting section 93 using the adhesive 97. Next, as shown in FIG. 8C, the terminal 17 of the element substrate 1 and the internal electrode 94 of the mounting substrate 90 are electrically connected by the wire 99 for wiring bonding. Next, as shown in FIGS. 4A and B, the sealing resin 98 is injected inside the side plate section 92 of the mounting substrate 90, then the sealing resin 98 is cured, and the element substrate 1 is sealed using the sealing resin 98. As a result, it is possible to obtain the electro-optical device 100 on which the element substrate 1 is sealed using the spacer 61, the light-transmitting cover 71, the mounting substrate 90, and the sealing resin 98.

Main Effects of Embodiment

As described above, in the embodiment, the one face 1s side of the element substrate 1 on which the mirror 50 and the driving element 30 are provided is sealed by the spacer 61 and the light-transmitting cover 71, and the inorganic barrier layer 81 which covers the boundary 67 of the spacer 61 and the light-transmitting cover 71 is formed on the outer face 61w on the opposite side from the mirror 50 of the spacer 61 and the side face 71w of the light-transmitting cover 71. For this reason, it is possible to suppress infiltration of moisture from the boundary 67 of the spacer 61 and the light-transmitting cover 71 using the inorganic barrier layer 81. Accordingly, it is difficult for a failure to occur in which it is not possible to move the mirror 50 by adsorption of the tilted mirror 50 to a member on the periphery thereof via water droplets when the mirror 50 is driven.

Embodiment 2

Figure 9:
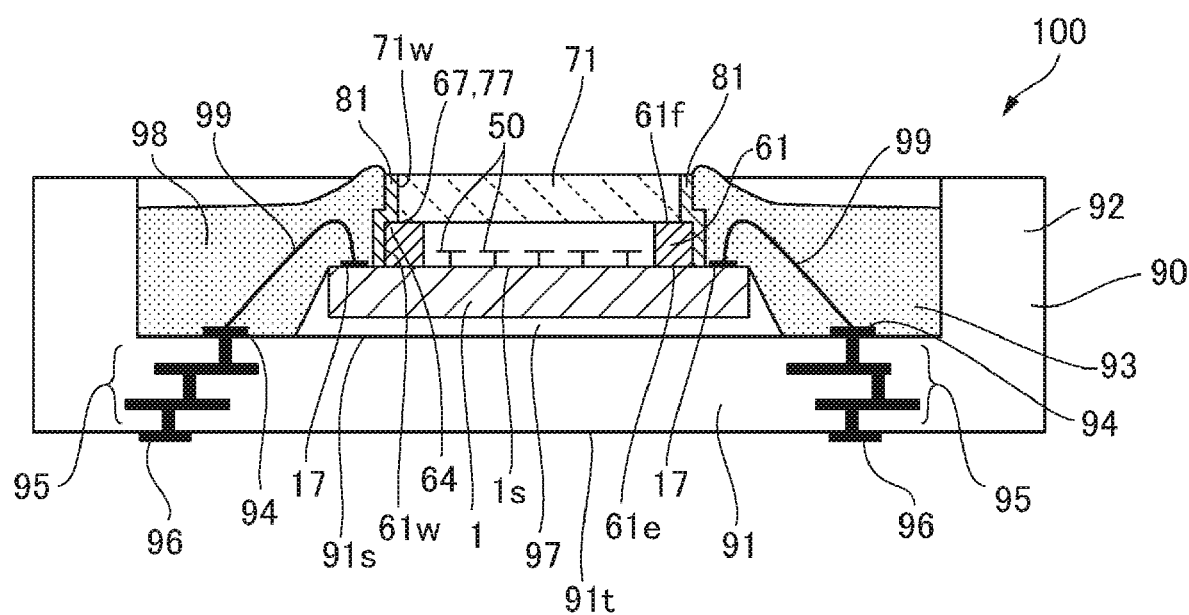
FIG. 9 is a sectional view of an electro-optical device according to Embodiment 2 of the invention.

FIG. 9 is a sectional view of the electro-optical device 100 according to embodiment 2 of the invention. FIGS. 10A to 10D are sectional views illustrating a process in a manufacturing method of the electro-optical device 100 according to embodiment 2 of the invention. Here, in the present embodiment and each embodiment which will be described later, since the basic configuration is the same as in Embodiment 1, common portions are given the same reference numerals and description thereof is omitted.

As shown in FIG. 9, in the same manner as Embodiment 1, in the electro-optical device 100 of the embodiment, the inorganic barrier layer 81 is formed on the outer face 61w of the spacer 61 and the side face 71w of the light-transmitting cover 71, and the boundary 67 of the spacer 61 and the light-transmitting cover 71 is covered by the inorganic barrier layer 81.

Here, the spacer 61 is provided with a protruding section 64 which overhangs further toward the opposite side from the mirror 50 than the side face 71w of the light-transmitting cover 71, and the boundary 67 of the spacer 61 and the light-transmitting cover 71 is positioned on a stepped section 77 which faces the opposite side from the element substrate 1. In addition, the inorganic barrier layer 81 connects from the outer face 61w of the spacer 61 to the side face 71w of the light-transmitting cover 71 via a face on the opposite side from the face which faces the element substrate 1 of the protruding section 64 of the spacer 61. For this reason, it is difficult for moisture to infiltrate from the boundary 67 in a space in which the mirror 50 is disposed since it is possible to reliably cover the boundary 67 using the inorganic barrier layer 81.

Figure 10A:
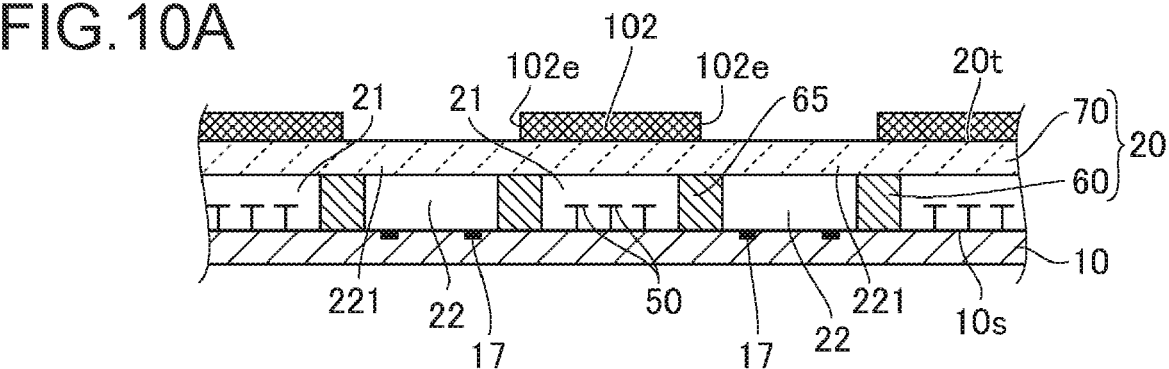
FIGS. 10A to 10D are sectional views illustrating a process in a manufacturing method of the electro-optical device according to Embodiment 2 of the invention.
Figure 10B:
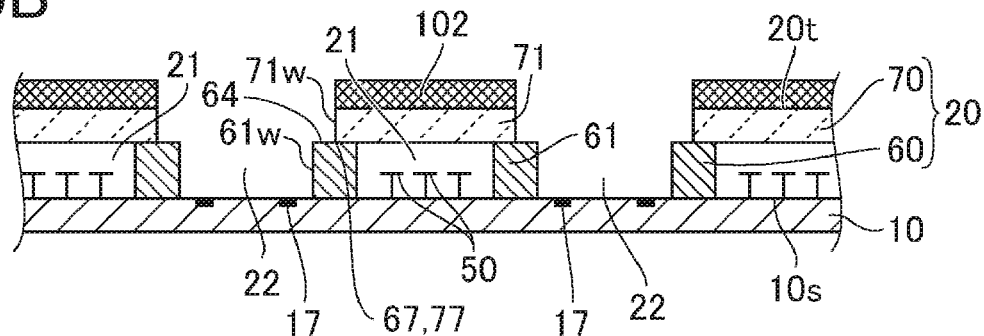

In the penetrating process which is described with reference to FIG. 6B, in the electro-optical device 100 of this configuration, when the bottom section 221 of the groove 22 is passed through, as shown in FIG. 10B, it is possible to configure the electro-optical device 100 by removing a wider width of the light-transmitting wafer 70 than the width of the groove 22 which is formed on the spacer wafer 60.

In the embodiment, the penetrating process is carried out by etching. For this reason, in the embodiment, first, as shown in FIG. 10A, a resist mask 102 is formed on the third face 20t of the second wafer 20. At that time, the resist mask 102 is formed such that an end section 102e of the resist mask 102 overlaps with an intermediate position in a width direction of the frame section 65 for forming the spacer 61.

Figure 10C:
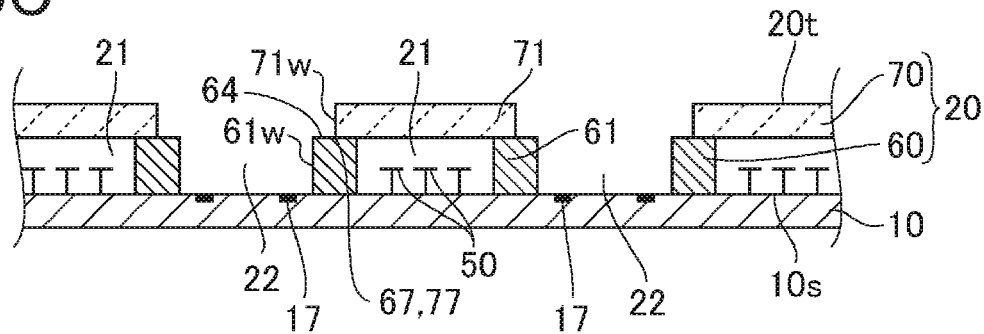
Figure 10D:
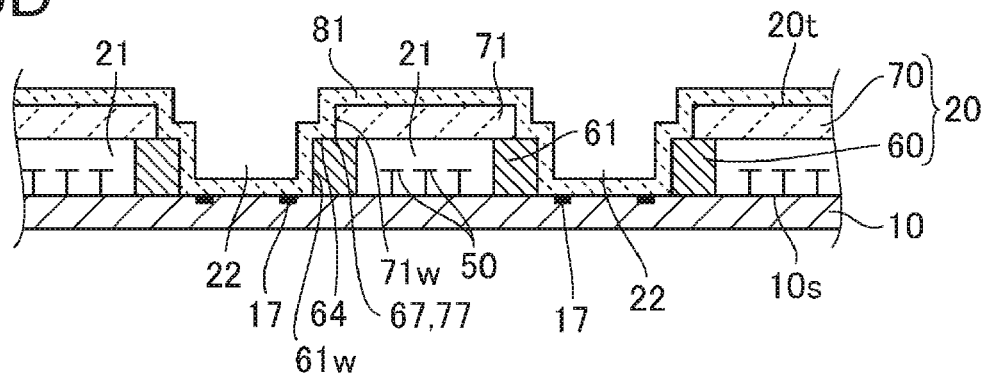

As shown in FIG. 10B, when carrying out etching in this state, the spacer 61 is a form having the protruding section 64 which overhangs further toward the opposite side from the mirror 50 than the side face 71w of the light-transmitting cover 71, and the boundary 67 of the spacer 61 and the light-transmitting cover 71 is positioned on the stepped section 77 which faces the opposite side (third face 20t side of the second wafer 20) from the element substrate 1. Next, as shown in FIG. 10C, the resist mask 102 is removed, then the inorganic barrier layer forming process illustrated in FIG. 10D is carried out, and the inorganic barrier layer 81 is formed inside the groove 22 from the third face 20t side of the second wafer 20. The following processes are the same as in Embodiment 1, and description is therefore omitted.

Here, in the embodiment, the groove 22 passes through the spacer wafer 60 in the same manner as the through hole 66. For this reason, when etching is carried out in the penetrating process, there is no adhesive layer interposed between the light-transmitting wafer 70 and the spacer wafer 60 on the bottom section 221 of the groove 22. Therefore, in the penetrating process, it is possible to smoothly carry out etching since it is sufficient if only the light-transmitting wafer 70 is etched.

Embodiment 3

FIGS. 11A to 11E are sectional views illustrating a process in a manufacturing method of the electro-optical device 100 according to Embodiment 3 of the invention. In the embodiment, the electro-optical device 100 which is described with reference to FIG. 9 is manufactured using a method described with reference to FIGS. 11A to 11E. In the embodiment, after the second wafer forming process which is described with reference to FIGS. 5A to 5F, and before the adhering process which is described with reference to FIG. 6A, the penetrating process is carried out in which the groove 22 is penetrated up to the third face 20t of the second wafer 20 by removing the bottom section 221 of the groove 22. In addition, after the adhering process, and before the splitting process, the inorganic barrier layer forming process is carried out with respect to the inner section of the groove 22 from the third face 20t of the second wafer 20.

Figure 11A:
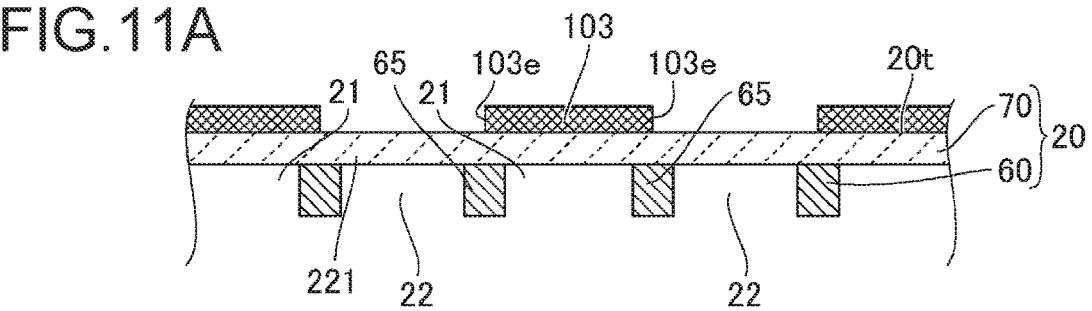
FIGS. 11A to 11E are sectional views illustrating a process in a manufacturing method of an electro-optical device according to Embodiment 3 of the invention.
Figure 11B:
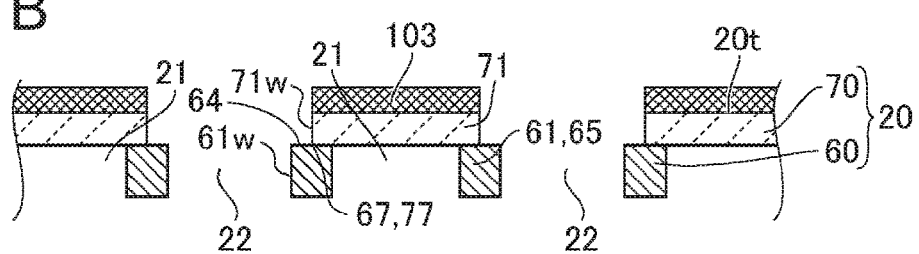

In further detail, as shown in FIG. 11A, after the second wafer 20 is formed, in the penetrating process, a resist mask 103 is formed on the third face 20t. At that time, the resist mask 103 is formed such that an end section 103e of the resist mask 103 overlaps with an intermediate position in a width direction of the frame section 65 for forming the spacer 61. As shown in FIG. 11B, when carrying out etching in this state, the bottom section 221 of the groove 22 is removed, and the groove 22 passes through to the third face 20t of the second wafer 20. As a result, out of the second wafer 20, the light-transmitting cover 71 is configured using a flat plate portion which is split from the light-transmitting wafer 70, and the spacer 61 is configured by a frame portion which is split from the spacer wafer 60. In addition, since the side of the light-transmitting wafer 70 is more widely removed than the spacer wafer 60, the spacer 61 is formed to overhang further toward the opposite side from the mirror 50 than the side face 71w of the light-transmitting cover 71. Here, in the embodiment, the linking section 68 illustrated in FIG. 5E remains such that the light-transmitting wafer 70 and the spacer wafer 60 are not completely split.

Figure 11C:
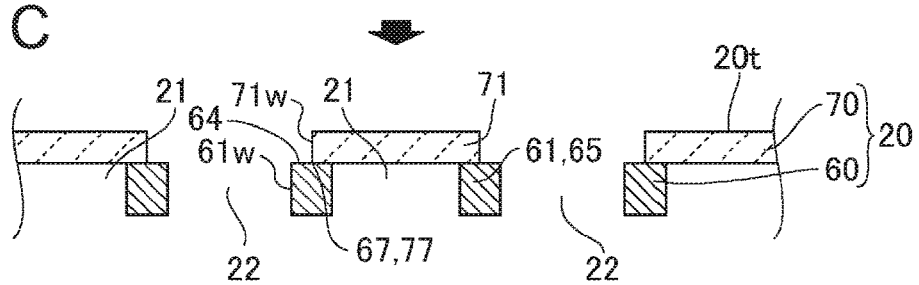
Figure 11D:
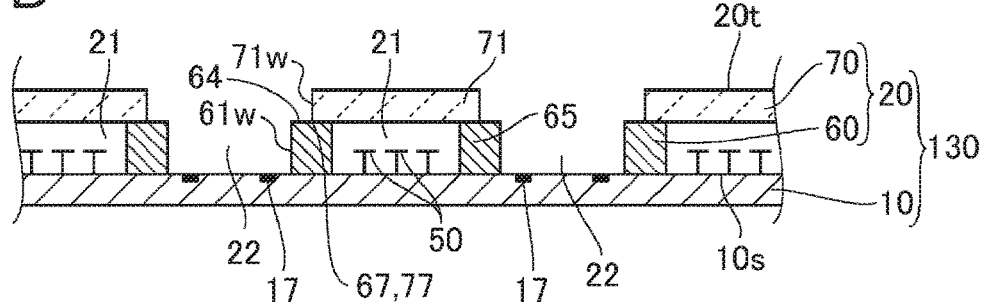
Figure 11E:
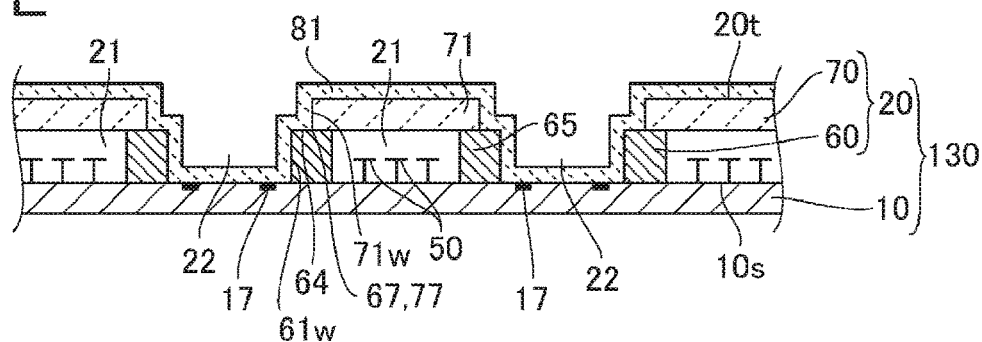

Next, as shown in FIG. 11C, after the resist mask 103 is removed, in the adhering process illustrated in FIG. 11D, the second face 20s of the second wafer 20 and the one face 10s of the first wafer 10 are adhered. Next, the inorganic barrier layer forming process illustrated in FIG. 11E is carried out, and the inorganic barrier layer 81 is formed inside the groove 22 from the third face 20t side of the second wafer 20. The following processes are the same as in Embodiment 1, and description is therefore omitted.

Here, in the embodiment, the groove 22 passes through the spacer wafer 60 in the same manner as the through hole 66. For this reason, when etching is carried out in the penetrating process, there is no adhesive layer interposed between the light-transmitting wafer 70 and the spacer wafer 60 on the bottom section 221 of the groove 22. Therefore, in the penetrating process, it is possible to smoothly carry out etching since it is sufficient if only the light-transmitting wafer 70 is etched.

Embodiment 4

FIGS. 12A to 12D are sectional views illustrating a process in a manufacturing method of the electro-optical device 100 according to Embodiment 4 of the invention. In the embodiment, the electro-optical device 100 which is described with reference to FIG. 9 is manufactured using a method described with reference to FIGS. 12A to 12D. In the embodiment, before the adhering process which is described with reference to FIG. 6A, the penetrating process is carried out in which the groove 22 is penetrated up to the third face 20t of the second wafer 20 by removing the bottom section 221 of the groove 22. In addition, after the penetrating process, and before the adhering process, the inorganic barrier layer forming process is carried out with respect to the inner section of the groove 22 from the third face 20t of the second wafer 20.

Figure 12A:
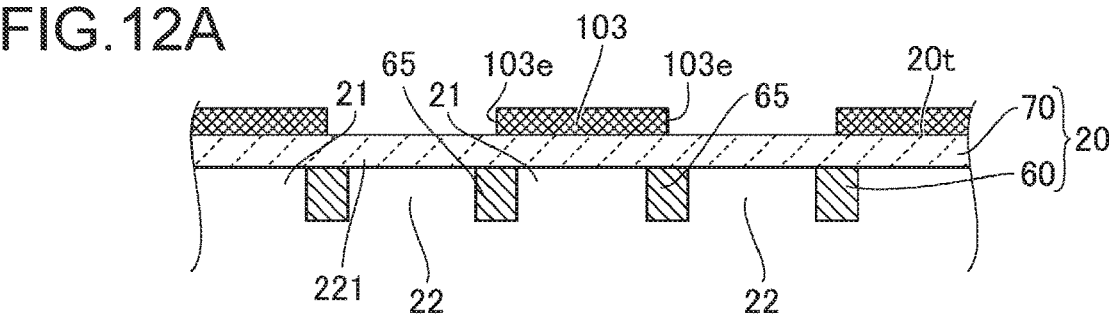
FIGS. 12A to 12D are sectional views illustrating a process in a manufacturing method of an electro-optical device according to Embodiment 4 of the invention.
Figure 12B:
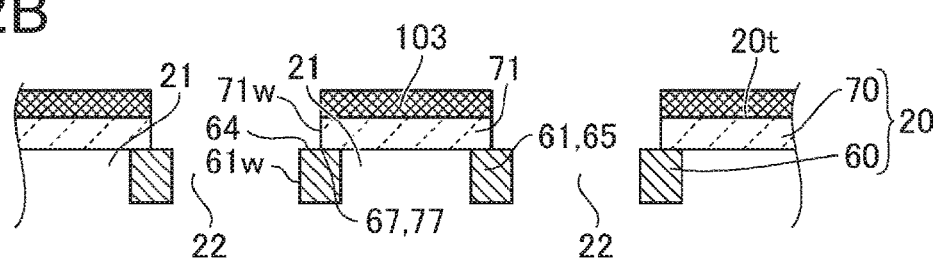

In further detail, as shown in FIG. 12A, after the second wafer 20 is formed, in the penetrating process, the resist mask 103 is formed in the third face 20t. At that time, the resist mask 103 is formed such that the end section 103e of the resist mask 103 overlaps with an intermediate position in the width direction of the frame section 65 for forming the spacer 61. As shown in FIG. 12B, when carrying out etching in this state, the bottom section 221 of the groove 22 is removed, and the groove 22 passes through to the third face 20t of the second wafer 20. As a result, out of the second wafer 20, the light-transmitting cover 71 is configured using a flat plate portion which is split from the light-transmitting wafer 70, and the spacer 61 is configured by a frame portion which is split from the spacer wafer 60. In addition, since the side of the light-transmitting wafer 70 is more widely removed than the spacer wafer 60, the spacer 61 is formed to overhang further toward the opposite side from the mirror 50 than the side face 71w of the light-transmitting cover 71. Here, in the embodiment, the linking section 68 illustrated in FIG. 5E remains such that the light-transmitting wafer 70 and the spacer wafer 60 are not completely split. The processes above are the same as in Embodiment 3.

Figure 12C:
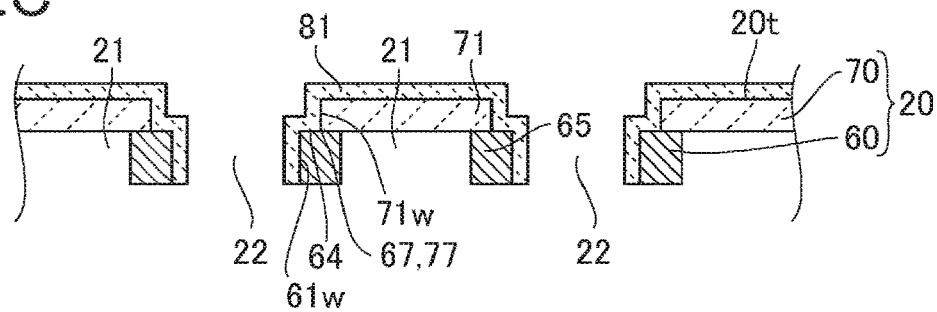

Next, as shown in FIG. 12C, the resist mask 103 is removed, then the inorganic barrier layer forming process illustrated in FIG. 12C is carried out, and the inorganic barrier layer 81 is formed inside the groove 22 from the third face 20t side of the second wafer 20.

Figure 12D:
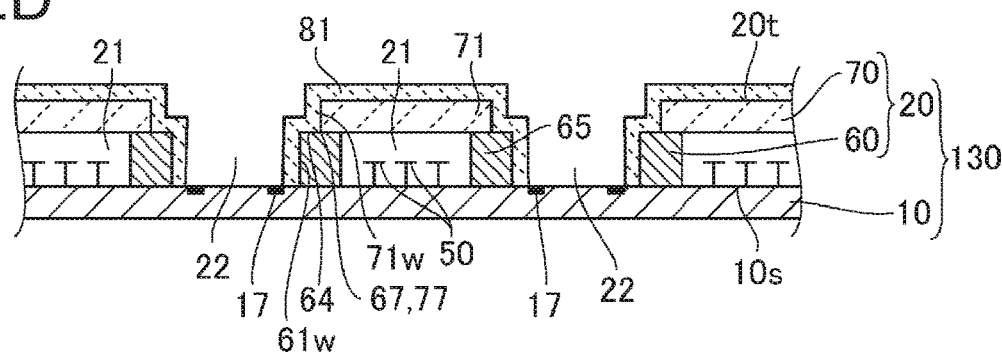

Next, in the adhering process illustrated in FIG. 12D, the second face 20s of the second wafer 20 and the one face 10s of the first wafer 10 are adhered. The following processes are the same as in Embodiment 1, and description is therefore omitted.

Here, in the embodiment, the groove 22 passes through the spacer wafer 60 in the same manner as the through hole 66. For this reason, when etching is carried out in the penetrating process, there is no adhesive layer interposed between the light-transmitting wafer 70 and the spacer wafer 60 on the bottom section 221 of the groove 22. Therefore, in the penetrating process, it is possible to smoothly carry out etching since it is sufficient if only the light-transmitting wafer 70 is etched.

Embodiment 5

Figure 13:
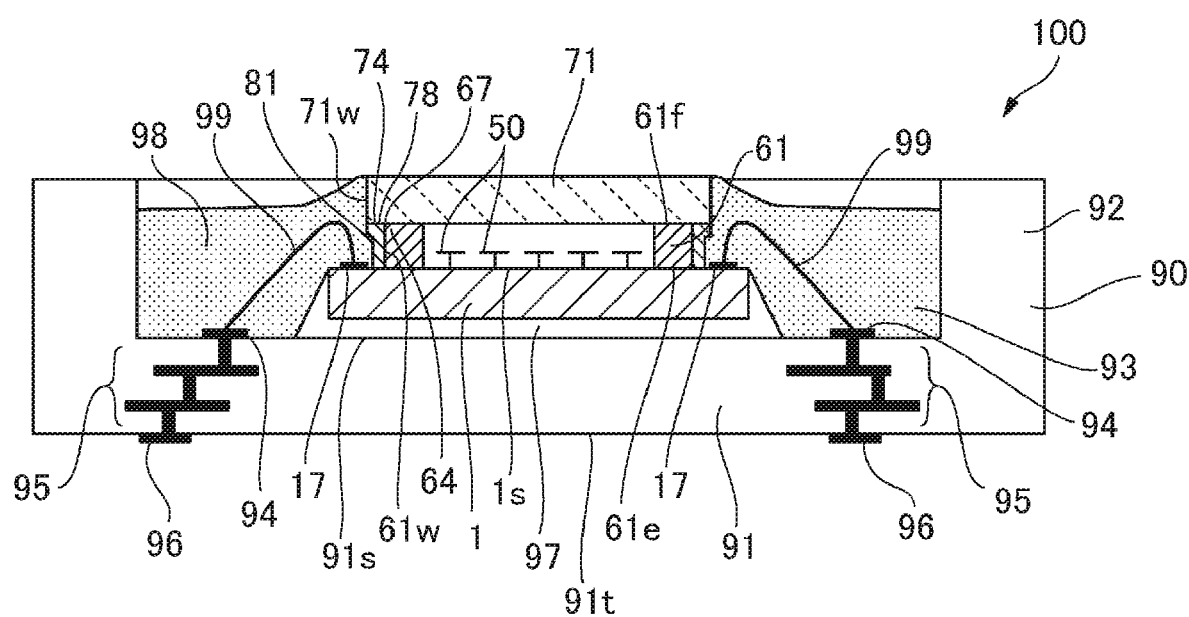
FIG. 13 is a sectional view of an electro-optical device according to Embodiment 5 of the invention.

FIG. 13 is a sectional view of the electro-optical device 100 according to Embodiment 5 of the invention. FIGS. 14A to 14E are sectional views illustrating a process in a manufacturing method of the electro-optical device 100 according to Embodiment 5 of the invention. FIGS. 15A and 15B are explanatory diagrams of penetrating process or the like which is performed during the manufacture of the electro-optical device 100 according to Embodiment 5 of the invention.

As shown in FIG. 13, in the same manner as in Embodiment 1, in the electro-optical device 100 of the embodiment, the inorganic barrier layer 81 is formed on the outer face 61w of the spacer 61 and the light-transmitting cover 71, and the boundary 67 of the spacer 61 and the light-transmitting cover 71 is covered by the inorganic barrier layer 81.

Here, the light-transmitting cover 71 is provided with a protruding section 74 which overhangs further toward the opposite side from the mirror 50 than the outer face 61w of the spacer 61, and the boundary 67 of the spacer 61 and the light-transmitting cover 71 is positioned on a stepped section 78 which faces the element substrate 1 side. In addition, the inorganic barrier layer 81 is connected from the outer face 61w of the spacer 61 toward a face which faces the element substrate 1 of the protruding section 74 of the light-transmitting cover 71. For this reason, it is difficult for moisture to infiltrate from the boundary 67 in a space in which the mirror 50 is disposed since it is possible to reliably cover the boundary 67 using the inorganic barrier layer 81.

In the manufacture of the electro-optical device 100 of the configuration, in the embodiment, after the adhering process which is described with reference to FIG. 6A, and before performing the penetrating process and the splitting process, the inorganic barrier layer forming process is performed with respect to the inner section of the groove 22.

Figure 14A:
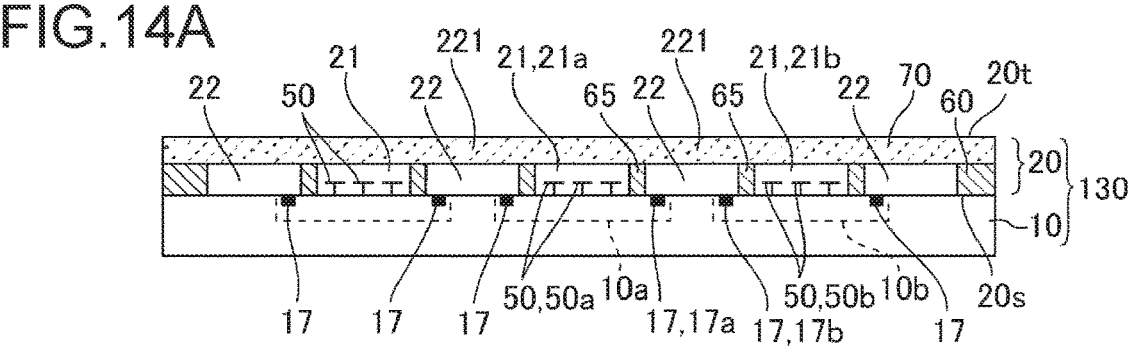
FIGS. 14A to 14E are sectional views illustrating a process in a manufacturing method of the electro-optical device according to Embodiment 5 of the invention.
Figure 15A:
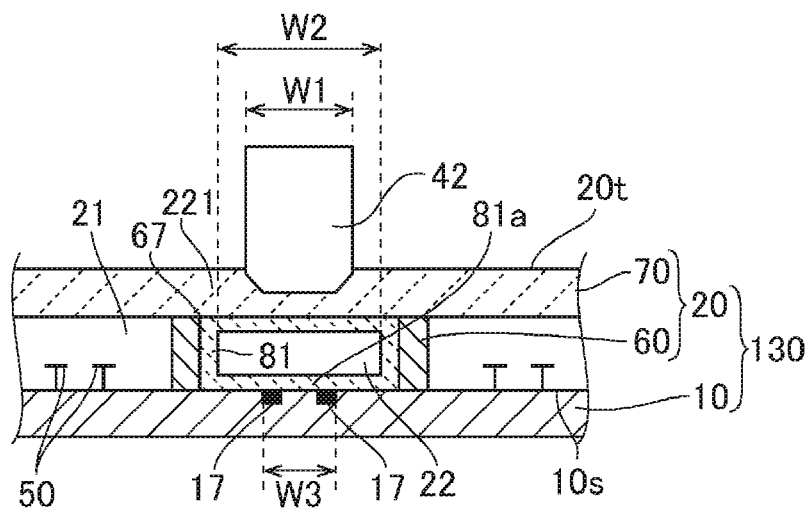
FIGS. 15A and 15B are explanatory views of a penetrating process or the like which is performed during the manufacture of the electro-optical device according to Embodiment 5 of the invention.
Figure 15B:
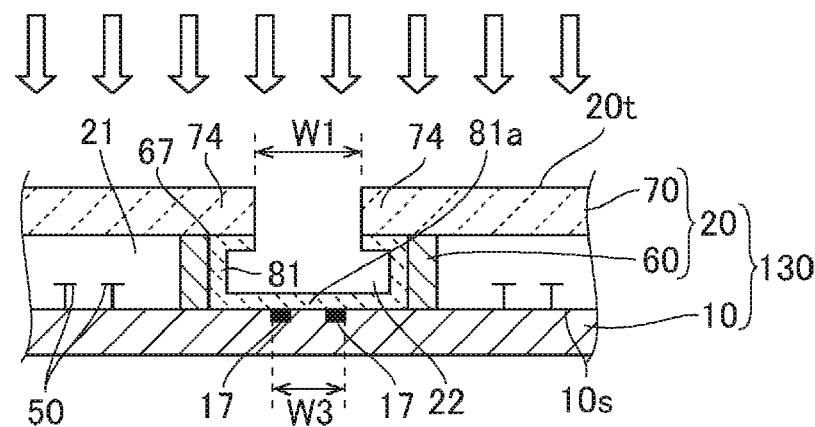
Figure 16:
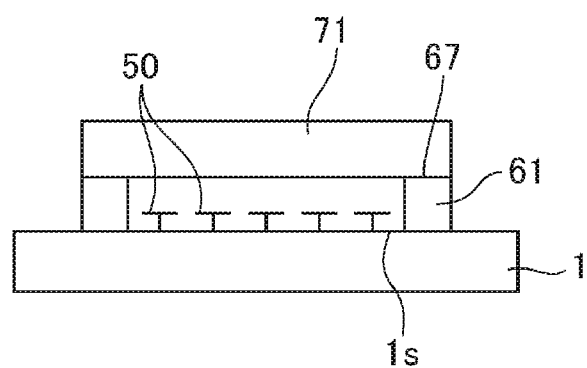
FIG. 16 is a sectional view illustrating a process in a manufacturing method of an electro-optical device according to a reference example of the invention.

In further detail, in the adhering process as shown in FIG. 14A, in the same manner as the adhering process which is described with reference to FIG. 6A, the one face 10s of the first wafer 10 is adhered to the second face 20s of the second wafer 20 so that the concave section 21 overlaps with the mirror 50 in planar view (for example, in planar view when the first wafer 10 is viewed from the one face 10s side), and the groove 22 overlaps with the terminal 17.

Figure 14B:
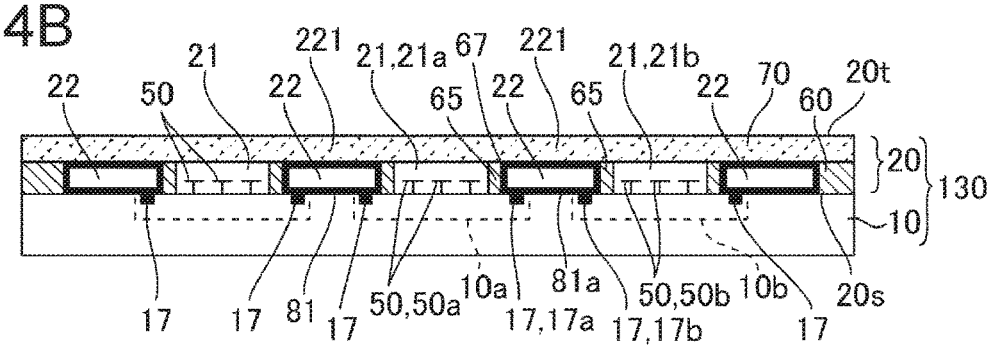

Next, in the inorganic barrier layer forming process illustrated in FIG. 14B, and the inorganic barrier layer 81 is selectively formed in the inside section of the groove 22. Accordingly, the inorganic barrier layer 81 is not formed on the third face 20t of the second wafer 20. The form of the inorganic barrier layer 81 is able to adopt an atomic layer deposition (ALD) method, a CVD method, a vapor disposition method, or the like, but in the embodiment the ALD method is utilized. At that time, a jig or the like is covered such that the inorganic barrier layer 81 is not formed on the outer face of the first wafer 10 or the third face 20t of the second wafer 20.

Figure 14C:
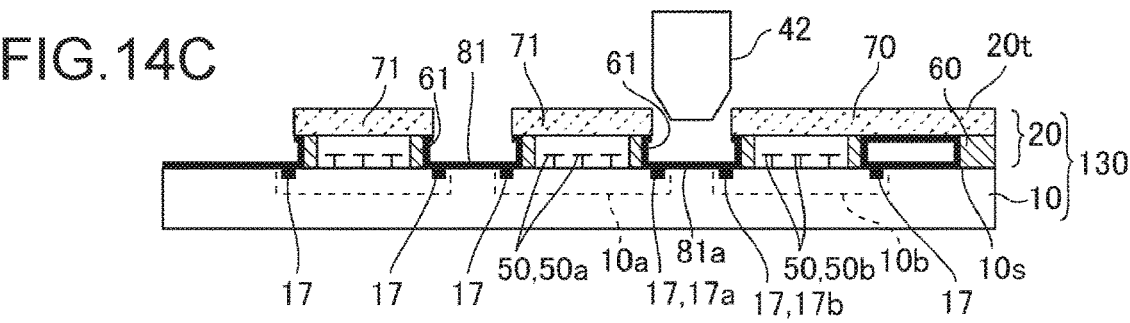

Next, in the penetrating process which is shown in FIG. 14C, the groove 22 is penetrated up to the third face 20t of the second wafer 20 by removing the bottom section 221 of the groove 22 of the second wafer 20. In the embodiment, the second wafer dicing blade 42 is caused to enter from the third face 20t of the second wafer 20 toward the groove 22, and the light-transmitting wafer 70 is split. As a result, the second wafer 20 is separated between the first region 10a and the second region 10b. In addition, out of the second wafer 20, the light-transmitting cover 71 is configured using a flat plate portion which is split from the light-transmitting wafer 70, and the spacer 61 is configured by a frame portion which is split from the spacer wafer 60.

Figure 14D:
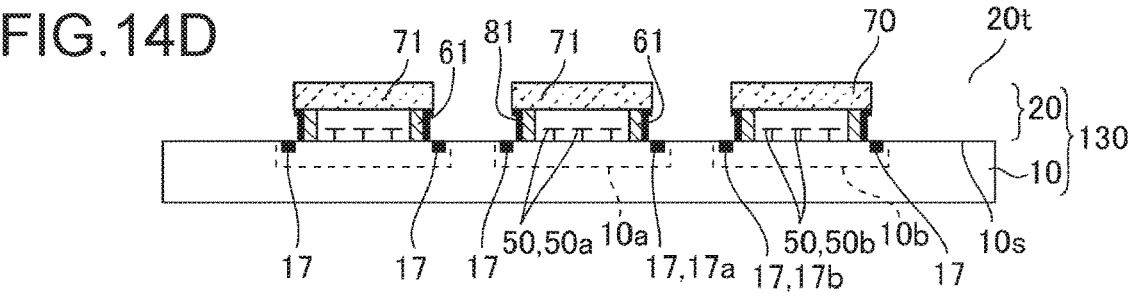

Next, as shown in FIG. 14D, the inorganic barrier layer 81 is removed from a position which overlaps with the groove 22 of the element substrate 1 by the processes illustrated in FIGS. 15A and 15B. As a result, the portion 81a of the inorganic barrier layer 81 is removed which is formed between the first region 10a and the second region 10b of the one face 10s.

First, as shown in FIG. 15A, a thickness W1 of the second wafer dicing blade 42 which is used in the penetrating process is narrower than a gap W2 which is interposed by the inorganic barrier layers 81 which are formed on inner walls which oppose the groove 22. For this reason, the light-transmitting cover 71 (light-transmitting wafer 70) has a structure which is provided with the protruding section 74 which overhangs inside the groove 22. Accordingly, in this state, when anisotropic etching (dry etching) is carried out, it is possible to selectively carry out etching on the inorganic barrier layer 81 which is formed on the one face 10s of the first wafer 10, even if an etching mask is not used, since the protruding section 74 of the light-transmitting wafer 70 (in other words, the light-transmitting wafer 70) functions as a mask. At that time, the thickness of the second wafer dicing blade 42 is thicker than a width W3 of a region in which the terminal 17 is formed. Accordingly, in the first wafer 10, it is possible to reliably remove the inorganic barrier layer 81 which is formed on the front face of the terminal.

Figure 14E:
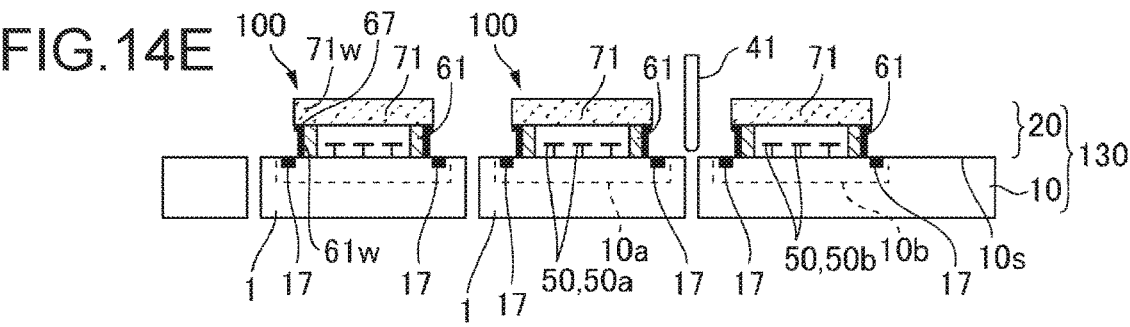

Next, in the splitting process, as shown in FIG. 14E, dicing is carried out on the first wafer 10 along the groove 22 in the first wafer 10 using the first wafer dicing blade 41. In the embodiment, dicing is carried out on the first wafer 10 by causing the first wafer dicing blade 41 to enter a cutting location (between the adjacent light-transmitting covers 71 and between the adjacent spacers 61) of the second wafer 20 from the second wafer 20 side with respect to the first wafer 10. As a result, the first wafer 10 is separated between the first region 10*a* and the second region 10*b*. In addition, the stacked body 130 of the first wafer 10 and the second wafer 20 is split, and a plurality of electro-optical devices 100 is manufactured. As further shown in FIG. 13, in a case where the electro-optical device 100 is sealed using the mounting substrate 90 and the sealing resin 98, the process illustrated in FIGS. 8A to 8C are performed.

What is claimed is:

1. A manufacturing method of an electro-optical device comprising:
   preparing a first wafer which is provided with a first mirror and a first driving element that drives the first mirror in a first region on a first face side, and which is provided with a second mirror and a second driving element that drives the second mirror in a second region on the first face side;
   forming a second wafer which is obtained by overlapping and adhering a light-transmitting wafer and a spacer wafer and which is provided with a second face on which a first concave section and a second concave section which penetrate the spacer wafer are provided;
   adhering the first face of the first wafer and the second face of the second wafer such that the first concave section overlaps with the first mirror in planar view and such that the second concave section overlaps with the second mirror in planar view; and
   splitting a stacked body of the first wafer and the second wafer at a region between the first region and the second region,
   wherein before the splitting of the second wafer, forming of an inorganic barrier layer which covers a boundary of the light-transmitting wafer and the spacer wafer is performed.

2. The manufacturing method of the electro-optical device according to claim 1,
   wherein, in the forming of the second wafer, the second wafer in which a groove is provided between the first concave section and the second concave section is formed.

3. The manufacturing method of the electro-optical device according to claim 2,
   wherein, in the forming of the second wafer, the groove is formed so as to penetrate the spacer wafer before overlapping and adhering the light-transmitting wafer and the spacer wafer.

4. The manufacturing method of the electro-optical device according to claim 2,
   wherein, after the adhering and before penetrating of the groove by removing a bottom section of the groove up to a third face that is a face on the opposite side from the second face of the second wafer, the forming of the inorganic barrier layer on the inside of the groove is performed.

5. The manufacturing method of the electro-optical device according to claim 4,
   wherein in the forming of the inorganic barrier layer, a first portion of the inorganic barrier layer is formed between the first region and the second region of the first wafer on the first face side,
   in the penetrating, the bottom section of the groove is removed from the third face of the second wafer using a dicing blade, and
   after the penetrating, and before the splitting, etching is performed in which the first portion of the inorganic barrier layer that is formed on the first wafer is removed by performing etching on the inorganic barrier layer.

6. The manufacturing method of the electro-optical device according to claim 5,
   wherein the thickness of the dicing blade is smaller than a gap which is interposed by the inorganic barrier layers formed on inner walls of the groove which oppose each other, and
   in the etching, the first portion of the inorganic barrier layer is removed by performing etching using the light-transmitting wafer as a mask.

7. The manufacturing method of the electro-optical device according to claim 6,
   wherein a terminal is formed in a region which overlaps with the groove on the first wafer, and
   the thickness of the dicing blade is thicker than the width of a region in which the terminal is formed.

* * * * *